US012011045B2

(12) United States Patent
Taurino et al.

(10) Patent No.: US 12,011,045 B2
(45) Date of Patent: Jun. 18, 2024

(54) INDUCTIVELY HEATED AEROSOL-GENERATING SYSTEM WITH AMBIENT TEMPERATURE SENSOR

(71) Applicant: Philip Morris Products S.A., Neuchatel (CH)

(72) Inventors: Irene Taurino, Neuchatel (CH); Ihar Nikolaevich Zinovik, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 761 days.

(21) Appl. No.: 17/256,783

(22) PCT Filed: Jul. 4, 2019

(86) PCT No.: PCT/EP2019/068045
§ 371 (c)(1),
(2) Date: Dec. 29, 2020

(87) PCT Pub. No.: WO2020/008008
PCT Pub. Date: Jan. 9, 2020

(65) Prior Publication Data

US 2021/0137170 A1 May 13, 2021

(30) Foreign Application Priority Data

Jul. 5, 2018 (EP) .................................... 18182053

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/30* (2020.01); *A24F 40/42* (2020.01);
(Continued)

(58) Field of Classification Search
CPC .......... A24F 40/50; A24F 40/53; A24F 40/51; A24F 40/57
See application file for complete search history.

(56) References Cited

U.S. PATENT DOCUMENTS 10,045,568 B2 * 8/2018 Monsees .................. H05B 3/44
10,897,930 B2 * 1/2021 Weigensberg .......... A24F 40/40
(Continued)

FOREIGN PATENT DOCUMENTS

CN 105307524 A 2/2016
CN 107105792 A 8/2017
(Continued)

OTHER PUBLICATIONS

Japanese Office Action issued on May 1, 2023 in Japanese Patent Application No. 2020-568760 (with English translation), citing documents 1 and 15-16 therein, 17 pages.
(Continued)

*Primary Examiner* — Truc T Nguyen
(74) *Attorney, Agent, or Firm* — Oblon, McClelland, Maier & Neustadt, L.L.P.

(57) ABSTRACT

An aerosol-generating system is provided, including: a cartridge containing a volatile substrate and having a susceptor; and an aerosol-generating device configured to receive the cartridge, the aerosol-generating device including: a housing having a chamber sized to receive at least a portion of the cartridge, an inductor coil disposed around at least a portion of the chamber, a power supply, an ambient temperature sensor, and control circuitry configured to control a supply of power from the power supply to the inductor coil based on one or more ambient temperature readings from the ambient temperature sensor. An aerosol-generating device and a method of controlling inductive heating in an aerosol-generating system are also provided.

15 Claims, 6 Drawing Sheets

(51) Int. Cl.

| | |
|---|---|
| ***A24F 40/30*** | (2020.01) |
| ***A24F 40/42*** | (2020.01) |
| ***A24F 40/465*** | (2020.01) |
| ***A24F 40/51*** | (2020.01) |
| ***H05B 6/08*** | (2006.01) |
| ***H05B 6/10*** | (2006.01) |

(52) U.S. Cl.
CPC ............ *A24F 40/465* (2020.01); *A24F 40/51* (2020.01); *H05B 6/08* (2013.01); *H05B 6/108* (2013.01)

(56) References Cited

U.S. PATENT DOCUMENTS

| | | | | |
|---|---|---|---|---|
| 11,478,021 | B2 * | 10/2022 | Bowen | A24F 42/60 |
| 2013/0333711 | A1 | 12/2013 | Liu | |
| 2014/0253144 | A1 * | 9/2014 | Novak, III | A24F 40/50 324/550 |
| 2015/0128967 | A1 | 5/2015 | Robinson et al. | |
| 2015/0359263 | A1 * | 12/2015 | Bellinger | A24F 40/53 392/394 |
| 2016/0174611 | A1 * | 6/2016 | Monsees | A24F 40/50 392/386 |
| 2017/0045994 | A1 | 2/2017 | Murison et al. | |
| 2017/0055585 | A1 | 3/2017 | Fursa et al. | |
| 2017/0055587 | A1 | 3/2017 | Zinovik et al. | |
| 2017/0172208 | A1 | 6/2017 | Mironov | |
| 2017/0196273 | A1 * | 7/2017 | Qiu | A24F 40/44 |
| 2017/0238610 | A1 * | 8/2017 | Reevell | G06F 1/04 |
| 2017/0280771 | A1 | 10/2017 | Courbat et al. | |
| 2018/0029782 | A1 | 2/2018 | Zuber et al. | |
| 2018/0289065 | A1 * | 10/2018 | Liao | A24F 7/04 |
| 2019/0274354 | A1 * | 9/2019 | Sur | H05B 1/0244 |
| 2019/0289908 | A1 * | 9/2019 | Worm | A61M 11/042 |

FOREIGN PATENT DOCUMENTS

| | | | | |
|---|---|---|---|---|
| CN | 107373779 A | | 11/2017 | |
| EP | 2 908 673 A2 | | 8/2015 | |
| GB | 253080 | * | 6/2016 | A24F 47/00 |
| JP | 2015-536648 A | | 12/2015 | |
| JP | 2017-516269 A | | 6/2017 | |
| JP | 2018-502587 A | | 2/2018 | |
| RU | 2 496 393 C2 | | 10/2013 | |
| RU | 2 618 436 C2 | | 5/2017 | |
| WO | WO 2008/121610 A1 | | 10/2008 | |
| WO | WO 2014/040988 A2 | | 3/2014 | |
| WO | WO 2014/060267 A2 | | 4/2014 | |
| WO | WO 2015/117257 A1 | | 8/2015 | |
| WO | WO 2015/177043 A1 | | 11/2015 | |
| WO | WO 2015/177045 A1 | | 11/2015 | |
| WO | WO 2015/177255 A1 | | 11/2015 | |
| WO | WO 2015/177256 A1 | | 11/2015 | |
| WO | WO 2015/192084 A1 | | 12/2015 | |
| WO | WO 2017/108992 A1 | | 6/2017 | |
| WO | WO 2017/140898 A1 | | 8/2017 | |
| WO | WO 2017/182485 A1 | | 10/2017 | |

OTHER PUBLICATIONS

International Search Report and Written Opinion issued on Oct. 21, 2019 in PCT/EP2019/068045 filed on Jul. 4, 2019.
Decision to Grant issued October 3. 2022 in Russian Patent Application No. 2020141856 (with English translation), citing documents 15 through 17 therein, 18 pages.
Russian Search Report Oct. 3, 2022 in Russiar: Patent Application No. 2020141855 (with English translation), citing documents 15 through 17 therein, 4 pages.
Combined Chinese Office Action and Search Report issued Aug. 27, 2023 in Chinese Patent Application No. 201980039478.6 (with English Translation), 14 pages.
Japanese Office Action issued on Dec. 4, 2023 in Japanese Patent Application No. 2020-568760 (with English translation), 5 pages.

* cited by examiner

INDUCTIVELY HEATED AEROSOL-GENERATING SYSTEM WITH AMBIENT TEMPERATURE SENSOR

The invention relates to an aerosol-generating system and an aerosol-generating device. In particular, the invention relates to a system comprising a nicotine source and an acid source for the in situ generation of an aerosol comprising nicotine salt particles.

Systems for delivering nicotine to a user which generate an inhalable aerosol from a solid aerosol-forming substrate, such as tobacco, by heating rather than combusting the solid aerosol-forming substrate are known. Some of these systems comprise an aerosol-generating device having a chamber configured to receive a solid aerosol-forming substrate and a heater within or around the chamber for heating the solid aerosol-forming substrate and releasing volatile compounds from the substrate which cool to form an aerosol. The solid aerosol-forming substrate may be provided in a cartridge. The cartridge may be in the form of a rod comprising the solid aerosol-forming substrate, such as a gathered, crimped sheet of tobacco, and other elements, such as filters and transfer portions, wrapped together in the form of a rod, similar to a conventional cigarette.

Systems for delivering nicotine to a user which generate an inhalable aerosol from a liquid aerosol-forming substrate containing nicotine and one or more aerosol formers are known. Such systems typically comprise devices having a reservoir containing the liquid aerosol-forming substrate, a heater for vaporising the liquid aerosol-forming substrate to generate an aerosol and a liquid transport element for supplying the substrate to the heater. A known configuration for such devices comprises a liquid transport element in the form of a capillary wick, having a portion extending into a reservoir of the substrate and a portion extending out of the reservoir, and a heater in the form of an electrically resistive coil that is wound around the portion of the capillary wick that extends out of the reservoir.

Systems for delivering nicotine to a user comprising a nicotine source and a volatile delivery enhancing compound source are also known. For example, WO 2008/121610 A1 and WO 2017/108992 A1 disclose devices in which nicotine and an acid, such as pyruvic acid or lactic acid, are reacted with one another in the gas phase to form an aerosol of nicotine salt particles that is inhaled by the user. Systems comprising a separate acid source and nicotine source typically react the nicotine and acid in gaseous form to form an aerosol of nicotine salt particles. To control and balance the vapour concentrations of the nicotine and acid to yield an efficient reaction stoichiometry, it has been proposed to heat the nicotine and acid in devices of the type disclosed in WO 2008/121610 A1.

All of the above systems comprise one or more volatile substrates and one or more heaters for heating the one or more volatile substrates. Various heater configurations are known. One heater configuration comprises one or more electrically resistive heating elements. The electrically resistive heating elements may form part of the device and be connected to a power supply of the device. The electrically resistive heating elements may form part of a cartridge containing the volatile substrate and may be connected to a power supply of the device when the cartridge is received by the device, via complimentary contacts on the cartridge housing and the device housing. Another heater configuration comprises an inductive heating arrangement comprising one or more susceptor elements and one or more inductor coils. Typically, the susceptor element is arranged in a cartridge comprising the one or more volatile substrates and the device comprising an inductor coil configured to generate an oscillating magnetic field that induces a voltage in the susceptor element to heating the susceptor element, when the cartridge is received by the device.

An aerosol-generating system using an inductive heating arrangement has the advantage that no electrical contacts need be formed between a cartridge having a susceptor and a device comprising an inductor coil in order to heat a volatile substrate in the cartridge. The susceptor element need not be electrically joined to any other components, eliminating the need for solder or other bonding elements. Furthermore, the inductor coil is provided as part of the device making it possible to construct a cartridge that is simple, inexpensive and robust. Cartridges are typically disposable articles produced in much larger numbers than the devices with which they operate. Accordingly reducing the cost of cartridges, even if it requires a more expensive device, can lead to significant cost savings for both manufacturers and consumers.

Since a susceptor element in a cartridge is not directly physically connected to the control circuitry of the aerosol-generating device, the control circuitry is not able to directly measuring electrical properties or quantities of the susceptor, such as the electrical resistance of the susceptor. As such, it is not possible for the control circuitry to directly measure a property or quantity of the susceptor and calculate the temperature of the susceptor from known relationships between the measured quantity and temperature.

It has also been found that the ambient temperature in the vicinity of an aerosol-generating system can affect the ability of the system to raise the temperature of the cartridge to the desired operating temperature and to maintain the temperature of the cartridge at a desired operating temperature.

It would be desirable to provide an inductively heated aerosol-generating system that is capable of operating in a broad range of ambient temperatures. It would be desirable to provide an inductively heated aerosol-generating system that is capable of heating a volatile substrate to a desired temperature in a broad range of ambient temperatures. It would be desirable to provide an inductively heated aerosol-generating system that is capable of generating a consistent aerosol in a broad range of ambient temperatures. In particular, it would be desirable to provide an inductively heated aerosol-generating system comprising a nicotine source and an acid source for the in situ generation of an aerosol comprising nicotine salt particles that is capable of operating in a broad range of ambient temperatures while providing consistent aerosol delivery.

According to the invention there is provided an aerosol-generating system comprising: a cartridge having a volatile substrate and a susceptor; and an aerosol-generating device configured to receive the cartridge. The aerosol-generating device comprises: a housing having a chamber sized to receive at least a portion of the cartridge; an inductor coil disposed around at least a portion of the chamber; a power supply; an ambient temperature sensor and control circuitry configured to control the supply of power from the power supply to the inductor coil. The control circuitry is configured to control the supply of power from the power supply to the inductor coil based on one or more readings from the ambient temperature sensor.

Preferably, the power supply is connected to the inductor coil and is configured to provide an oscillating current to the inductor coil. Preferably, the oscillating current is a high frequency oscillating current. As used herein, a high frequency oscillating current means an oscillating current having a frequency of between 500 kHz and 30 MHz. The high frequency oscillating current may have a frequency of between 1 and 30 MHz, preferably between 1 and 10 MHz and more preferably between 5 and 7 MHz.

In operation, the oscillating current is passed through the inductor coil to generate an alternating magnetic field that induces a voltage in the susceptor element. The induced voltage causes a current to flow in the susceptor element and this current causes Joule heating of the susceptor element that in turn heats the portion of the cartridge in which the susceptor element is located. Because the susceptor element is ferromagnetic, hysteresis losses in the susceptor element also generate a significant amount of heat.

As used herein, a “susceptor element” means a conductive element that heats up when subjected to a changing magnetic field. This may be the result of eddy currents induced in the susceptor element and/or hysteresis losses.

The system is configured to raise the temperature of the cartridge above ambient temperature during an aerosol-generating experience. The system may be configured to raise the temperature of the cartridge to a “normal” or “standard” operating temperature or to a normal or standard temperature profile that varies over time during an aerosol-generating experience. The time required to raise the temperature of the cartridge from an initial temperature to a desired operating temperature may be referred to herein as the “preheating time”.

As used herein, the term “ambient temperature” is used to mean the air temperature in the vicinity of an aerosol-generating system. In other words, the term “ambient temperature” means the temperature of the air surrounding the aerosol-generating system.

As used herein, “the temperature of the cartridge” is used to refer to an average temperature of the cartridge and to the temperature of specific features or regions of the cartridge, such as one or more compartments of the cartridge or a susceptor element in the cartridge. It will be appreciated that different regions of a cartridge may be heated at different rates during heating of the susceptor element and that the average temperature of the cartridge may be significantly different to the local temperature in certain regions of the cartridge. For example, the temperature of a susceptor in the cartridge is likely to be significantly higher than the temperature at an outer wall of a housing of the cartridge. For some cartridges, the temperature of the susceptor itself or the temperature of one or more particular regions of the cartridge may be critically important for aerosol generation, whereas for other cartridges the average temperature of the cartridge may be critically important for aerosol generation. Accordingly, “the temperature of the cartridge” is used herein to generally refer to a temperature of the cartridge, and specific references to the temperature of a particular feature or region of a cartridge or to the average temperature of a cartridge are used where necessary to identify a particular temperature.

The aerosol-generating device comprises an ambient temperature sensor. The readings from the ambient temperature sensor are indicative of the ambient temperature in the vicinity of the system.

Advantageously, the ambient temperature sensor may be substantially thermally isolated from the chamber for receiving the cartridge. This may substantially prevent or inhibit the temperature sensed by the ambient temperature sensor from being influenced by the temperature of the cartridge. Advantageously, this may reduce the transfer of heat between the cartridge, the inductor coil and the ambient temperature sensor.

The ambient temperature sensor may be spaced from the chamber for receiving the cartridge. An air gap may be provided between the ambient temperature sensor and the chamber for receiving the cartridge. In some embodiments, the aerosol-generating device is elongate and comprises a longitudinal axis. The ambient temperature sensor may be spaced from the chamber for receiving the cartridge along the longitudinal axis. The ambient temperature sensor may be arranged at the opposite end of the device to the chamber for receiving the cartridge. The device may have a proximal end and a distal end, and the chamber may be arranged at the proximal end and the ambient temperature sensor may be arranged at the distal end of the device.

As used herein, the terms ‘proximal’ and ‘distal’ are used to describe the relative positions of components, or portions of components, of aerosol-generating devices and cartridge.

The ambient temperature sensor may be spaced from the control circuitry. The control circuitry may be connected to the ambient temperature sensor for receiving readings from the ambient temperature sensor.

The control circuitry and the ambient temperature sensor may be arranged on a printed circuit board. The ambient temperature sensor may be an integral with the control circuitry. The ambient temperature sensor may be an integral part of the control circuitry.

The ambient temperature sensor may be any suitable type of temperature sensor. Suitable temperature sensors include: band gap temperature sensors, resistance temperature detectors (RTDs), thermocouples, thermistors, particularly negative temperature coefficient (NTC) thermistors, and semiconductor temperature sensors. Preferably, the ambient temperature sensor is a mems temperature sensor. The ambient temperature sensor may be a negative temperature coefficient (NTC) temperature sensor. In some particularly preferred embodiments, the control circuitry and the ambient temperature sensor are provided on a printed circuit board. The printed circuit board may be spaced from the chamber for receiving the cartridge. In some embodiments, the control circuitry comprises a microprocessor or microcontroller or an application specific integrated chip (ASIC) comprising the ambient temperature sensor.

The control circuitry may be configured to take one or more ambient temperature readings from the ambient temperature sensor at any suitable time during or prior to an aerosol-generating experience. In some preferred embodiments, the control circuitry is configured to take one or more ambient temperature readings from the ambient temperature sensor before power is supplied to the inductor coil. In some particularly preferred embodiments, the control circuitry is configured to take one or more ambient temperature readings from the ambient temperature sensor after the device has been turned on by a user and before power is supplied to the inductor coil for the first time following the device being turned on. In other words, the control circuitry may be configured to take one or more ambient temperature readings from the ambient temperature sensor before an aerosol-generating experience. Advantageously, this may ensure that the one or more ambient temperature readings from the ambient temperature sensor are not affected by the temperature of the cartridge when the cartridge is being heated.

In some embodiments, the control circuitry is configured to take an ambient temperature reading from the ambient temperature sensor prior to an aerosol-generating experience. In some embodiments, the control circuitry is configured to take one ambient temperature reading from the ambient temperature sensor at the start of an aerosol-generating experience. In some embodiments, the control circuitry is configured to take a plurality of ambient temperature readings from the ambient temperature sensor during an aerosol-generating experience. The control circuitry may be configured to take ambient temperature readings from the ambient temperature sensor at regular intervals.

Advantageously, the inventors of the present invention have realised that the ambient temperature in the vicinity of the system affects the temperature of the cartridge during an aerosol-generating experience. In particular, the inventors have realised that the ambient temperature in the vicinity of the system affects the ability of the system to maintain the temperature of the cartridge at the desired operating temperature. The inventors have also realised that the ambient temperature in the vicinity of the system affects the preheating time of the system.

The system may have a predefined "normal" or "standard" ambient temperature at which the device is expected to be operated. The predefined "normal" ambient temperature may be room temperature. Room temperature as used herein means about 20 degrees Celsius.

Where the system is used at a "normal" ambient temperature, the system may be configured to raise the temperature of the cartridge from ambient temperature to a desired operating temperature within a predetermined preheating time. The system may be configured to maintain the temperature of the cartridge at the desired operating temperature once the desired operating temperature has been achieved.

The inventors have found that in some configurations the ability of the system to maintain the temperature of the cartridge at the desired operating temperature is not significantly affected by the ambient temperature in the vicinity of the system when the ambient temperature is within a "normal" ambient temperature range. Similarly, the inventors have found that in some configurations the preheating time of the system is not significantly affected by the ambient temperature when the ambient temperature in the vicinity of the system is within a "normal" ambient temperature range.

The "normal" ambient temperature range may be any suitable temperature range. The "normal" ambient temperature range may be within about 1, 2, 3, 4, 5, 6, 7, 8, 9 or 10 degrees Celsius of a predefined "normal" ambient temperature. The "normal" ambient temperature range may be within about 5 degrees Celsius of room temperature. When the system is used in environments having an ambient temperature of between about 15 degrees Celsius and about 25 degrees Celsius, the system may not need to adjust the power supplied to the inductor coil to compensate for the effect of the ambient temperature. A typical "normal" ambient temperature range may be between about 10 degrees Celsius and about 30 degrees Celsius, between about 12 degrees Celsius and about 27 degrees Celsius or between about 15 degrees Celsius and about 25 degrees Celsius.

The control circuitry is configured to control the supply of power from the power supply to the inductor coil to control the heating of the susceptor in the cartridge. The control circuitry may be configured to supply a particular power profile to the inductor coil over time. The control circuitry may be configured to supply a particular power profile to the inductor coil over time to raise the temperature of the cartridge to the desired operating temperature and to maintain the temperature of the cartridge at the desired operating temperature.

In some embodiments, the control circuitry may be configured to supply a constant power to the inductor coil. The control circuitry may be configured to supply a constant voltage to the inductor coil. The control circuitry may be configured to supply a constant current to the inductor coil.

In some embodiments, the control circuitry may be configured to vary the power supplied to the inductor coil over time. The control circuitry may be configured to increase the power from an initial power to an operating power over a predetermined period of time. The control circuitry may be configured to decrease the power supplied to the inductor coil from an initial power to an operating power over a predetermined period of time. Supplying an initial power to the inductor coil and decreasing the power supplied to the inductor coil after the preheating time period may be beneficial for raising the temperature of the cartridge to a desired operating temperature as quickly as possible. In some preferred embodiments, the control circuitry may be configured to gradually increase the power supplied from the power supply to the inductor coil over time from an initial power to an operating power. The gradual increase in power may be a continuous gradual increase or a stepwise or incremental increase. The control circuitry may be configured to gradually increase the power supplied from the power supply to the inductor coil over time from an initial power to a final preheating power that is greater than a subsequent operating power. The rate of increase may be constant over the preheating time period, such that the increase is linear with time. The rate of increase may increase over the preheating time period, such that the increase forms a convex curve with time. The rate of increase may decrease over the preheating time period, such that the increase forms a concave curve with time.

Where the system is used at a predefined normal ambient temperature or within a predefined normal ambient temperature range, the control circuitry may be configured to supply a "normal" or "standard" power profile to the inductor coil over time. The "normal" or "standard" power profile may correspond to a desired cartridge temperature profile. For example, a normal power profile may comprise the control circuitry supplying a constant average power from the power supply to the inductor coil throughout the duration of an aerosol-generating experience. In another example, a normal power profile may comprise the control circuitry supplying power from the power supply to the inductor coil in a predetermined curve over time during an aerosol-generating experience.

Any suitable power may be supplied from the power supply to the inductor coil during the aerosol-generating experience. For example, a suitable "normal" or "standard" operating power to be supplied from the power supply to the inductor coil may be between about 0.25 Watts and about 1 Watt, or between about 0.35 Watts and about 0.85 Watts or between about 0.45 Watts and about 0.78 Watts. For example, a normal final preheating power to be supplied from the power supply to the inductor coil may be between about 0.5 Watts and about 3 Watts, between about 0.75 Watts and about 2 Watts or between about 0.9 Watts and about 1.5 Watts, in embodiments where the final preheating power is greater than the subsequent operating power. These exemplary power values may be applicable to systems having cartridges comprising nicotine and acid sources, which are configured to raise the temperature of the cartridge to a maximum steady state temperature of between about 90 degrees Celsius and about 120 degrees Celsius.

In some embodiments, the control circuitry is configured to adjust the power supplied to the inductor coil based on the one or more ambient temperature readings to raise the temperature of the cartridge from ambient temperature to a desired operating temperature in a predetermined preheating time. This may help to ensure that the experience of a user of the system remains unchanged regardless of the ambient temperature.

Where the system is used in ambient temperatures below a predefined normal ambient temperature or below a predefined normal ambient temperature range it may be necessary to increase the power supplied to the inductor coil relative to the normal power profile. The control circuit may be configured to increase the power supplied to the inductor coil relative to the normal power profile when a reading from the ambient temperature sensor indicates that the ambient temperature is below a predefined normal ambient temperature or below a predefined normal temperature range. In some embodiments the control circuit may be configured to increase the power supplied to the inductor coil relative to the normal power profile during an initial preheating time period only. This may enable the system to raise the temperature of the cartridge to the desired operating temperature within a predefined preheating time period. In some embodiments the control circuit may be configured to increase the power supplied to the inductor relative to the normal power profile for the duration of an aerosol-generating experience.

In some embodiments, the control circuit may be configured to increase the duration of the preheating time period relative to the duration of the preheating time period of the normal power profile when a reading from the ambient temperature sensor indicates that the ambient temperature is below a predefined normal ambient temperature or below a normal ambient temperature range. This may comprise supplying an initial power to the inductor coil and reducing the power to an operating power after an increased preheating time period relative to the preheating time period of the normal power profile.

Where the system is used in ambient temperatures above a predefined "normal" ambient temperature or a predefined "normal" ambient temperature range it may be necessary to decrease the power supplied to the inductor coil relative to the normal power profile. The control circuit may be configured to decrease the power supplied to the inductor coil relative to the normal power profile when an ambient temperature reading from the ambient temperature sensor indicates that the ambient temperature is above a predefined normal ambient temperature or above a predefined normal temperature range. In some embodiments the control circuit may be configured to decrease the power supplied to the inductor coil relative to the normal power profile during an initial preheating time period only. This may enable the system to raise the temperature of the cartridge to the desired operating temperature within a predefined preheating time period without raising the temperature of the cartridge above the desired operating temperature. In some embodiments the control circuit may be configured to decrease the power supplied to the inductor relative to the normal power profile for the duration of an aerosol-generating experience.

In some embodiments, the control circuitry may be configured to decrease the duration of the preheating time period relative to the duration of the preheating time period of the normal power profile when a reading from the ambient temperature sensor indicates that the ambient temperature is below a predefined normal ambient temperature or below a normal ambient temperature range. This may comprise supplying an initial power to the inductor coil and reducing the power to an operating power after a decreased preheating time period relative to the preheating time period of the normal power profile.

In some preferred embodiments, the control circuitry is configured to control the power supplied to the inductor coil based on a target value. The target value corresponds to a parameter of the control circuitry that may be controlled by the control circuitry to adjust the power supplied to the inductor coil.

The target value may be a target power, such that the control circuitry is configured to maintain an average power supplied to the inductor coil at the target power value. The target value may also be any other suitable type of target value, such as a target voltage value, a target current value or a target resistance value. For example, the target value may be a target voltage value and the control circuitry may be configured to control the supply of power to the inductor coil by maintaining the average voltage across the inductor coil at a constant value corresponding to the target voltage value.

The control circuitry may comprise a memory storing the target value.

The control circuitry may be further configured to control the power supplied to the inductor coil by adjusting the target value based on the one or more ambient temperature readings from the ambient temperature sensor; and control the supply of power to the inductor coil based on the adjusted target value. The target value may be increased or decreased based on the one or more ambient temperature readings from the ambient temperature sensor.

In some embodiments, the magnitude of the adjustment of the target value may vary as a function of the one or more ambient temperature readings from the ambient temperature sensor. In other words, the control circuitry may adjust the target value based a known relationship between the target value and the one or more ambient temperature readings from the ambient temperature sensor. For example, the target value may be a target resistance of a component of the control circuitry and the resistance of the component may be known to vary proportionally with temperature.

In some preferred embodiments, the magnitude of the adjustment of the target value may be incremental, discrete or stepwise. In other words, the magnitude of the adjustment of the target value may be the same for a range of ambient temperature readings. Advantageously, this may reduce the resources required by the processor to adjust the target value. For example, where the ambient temperature readings indicate that the ambient temperature is up to 10 degrees Celsius above a predetermined normal ambient temperature range, the target value may be decreased by a first adjustment value, and where the ambient temperature readings indicate that the ambient temperature is over 10 degrees Celsius above the predetermined normal ambient temperature range, the target value may be decreased by a second adjustment value, greater than the first adjustment value. Similarly, where the ambient temperature readings indicate that the ambient temperature is up to 10 degrees Celsius below a predetermined normal ambient temperature range, the target value may be decreased by a first adjustment value, and where the ambient temperature readings indicate that the ambient temperature is below 10 degrees Celsius above the predetermined normal ambient temperature range, the target value may be increased by a second adjustment value, greater than the first adjustment value.

In some preferred embodiments, the system may be configured to operate within an operating ambient temperature range and the control circuitry may be configured to prevent or inhibit the supply of power from the power supply to the inductor coil if the one or more ambient temperature readings indicate that the ambient temperature is outside of the operating ambient temperature range. Suitable operating ambient temperature ranges for a system may be between about −10 degrees Celsius and about 50 degrees Celsius, between about −5 degrees Celsius and about 40 degrees Celsius, between about 0 degrees Celsius and about 37 degrees Celsius or between about 15 degrees Celsius and about 35 degrees Celsius. The control circuitry may be configured to prevent or inhibit the supply of power from the power supply to the inductor coil if the one or more ambient temperature readings indicate that the ambient temperature is below about 10 degrees Celsius, about 5 degrees Celsius, about 0 degrees Celsius, about −5 degrees Celsius or about −10 degrees Celsius. The control circuitry may be configured to prevent or inhibit the supply of power from the power supply to the inductor coil if the one or more ambient temperature readings indicate that the ambient temperature is above about 35 degrees Celsius, about 40 degrees Celsius, about 45 degrees Celsius, about 50 degrees Celsius or about 55 degrees Celsius.

In some of the preferred embodiments, the magnitude of the adjustment of the target value is determined based on a comparison of the one or more ambient temperature readings from the ambient temperature sensor with a plurality of reference ambient temperature values, each reference ambient temperature value being associated with a particular target value adjustment. For example, the control circuitry may be configured to compare each ambient temperature reading with a plurality of reference ambient temperature values. Each reference ambient temperature value may be associated with a particular target value adjustment.

In some embodiments, the target value may vary with time. In these embodiments, a target profile may be formed from a plurality of target values, each target value being associated with a particular time period of an aerosol-generating experience. For example, a first target value may be associated with a first 10 seconds of an aerosol-generating experience (i.e. a preheating time period of 10 seconds), and a second target value may be associated with the remaining time of an aerosol-generating experience, from 10 seconds onwards.

The control circuitry may be configured to control the power supplied to the inductor coil by adjusting the target profile based on the one or more ambient temperature readings from the ambient temperature sensor. In other words, the control circuitry may be configured to control the power supplied to the inductor coil by adjusting at least one of the plurality of target values and the times associated with each of the target values based on the one or more ambient temperature readings from the ambient temperature sensor. The magnitude of the adjustment of the target profile may be the same for each target value of the target profile. Advantageously, this may reduce the processor resources required to make the adjustment for ambient temperature.

The magnitude of the adjustment of the target value or the target values of a target profile may be any suitable magnitude. For example, the magnitude of the adjustment may be up to about 75 percent of the normal target value, up to about 50 percent of the normal target value, up to about 45 percent of the normal target value, up to about 35 percent of the normal target value, up to about 25 percent of the normal target value, up to about 15 percent of the normal target value or up to about 10 percent of the normal target value. In other words, where the magnitude of the adjustment is about 10 percent of the normal target value, an adjustment to increase the normal target value would result in the adjusted target value being 1.1 times the magnitude of the normal target value, and an adjustment to decrease the normal target value would result in the adjusted target value being 0.9 times the magnitude of the normal target value.

In some exemplary embodiments where the target value or target profile is a target power value or target power profile, the magnitude of the adjustment may be up to about 1 Watt, up to about 0.85 Watts, up to about 0.75 Watts, up to about 0.60 Watts, or up to about 0.55 Watts.

The target value or the target profile may be adjusted based on one or more ambient temperature readings from the ambient temperature sensor at any suitable time prior to an aerosol-generating experience or during an aerosol-generating experience. In some embodiments, the target value or target profile may be adjusted once, prior to an aerosol-generating experience. In some embodiments, the target value or target profile may be adjusted once, at the start of an aerosol-generating experience. In some embodiments, the target value or target profile may be adjusted a plurality of times prior to an aerosol-generating experience and during an aerosol-generating experience. The target value or the target profile may be adjusted at regular intervals.

Each ambient temperature reading from the ambient temperature sensor and each determination of a target value adjustment based on the measurement requires processor resources and power. Accordingly, it may be beneficial for the control circuitry to be configured to take one ambient temperature reading from the ambient temperature sensor during an aerosol-generating experience in order to reduce or minimize processor utilization and power consumption by the control circuitry.

An aerosol-generating experience may comprise continuous heating of the cartridge for a period of around six minutes, corresponding to the typical time taken to smoke a conventional cigarette, or for a period that is a multiple of six minutes. In another example, an aerosol-generating experience may comprise a predetermined number of puffs or discrete activations of the inductor coil.

Preferably, the one or more ambient temperature readings from the ambient temperature sensor may be measured prior to the start of an aerosol-generating experience or at the start of an aerosol-generating experience. Similarly, preferably the adjustment of the target value based on the one or more ambient temperature readings may be determined prior to the start of an aerosol-generating experience or at the start of an aerosol-generating experience.

In some embodiments, the control circuitry is configured to adjust the target value during a preheating time only. In other words, the control circuitry is configured to adjust the target value in the time required to raise the temperature of the cartridge from ambient temperature to a desired operating temperature In some embodiments, the control circuitry is configured to adjust the target value based on the one or more ambient temperature readings to raise the temperature of the cartridge from ambient temperature to a desired operating temperature in a predetermined preheating time.

This may help to ensure that the experience of a user of the system remains unchanged regardless of the ambient temperature.

Prior art proposals for determining the temperature of a susceptor in an inductively heated aerosol-generating system, without direct measurement of electrical quantities of the susceptor, are known. For example, in WO-A1-2015/177255, WO-A1-2015/177256 and WO-A1-2015/177257 an electrically operated aerosol-generating system is proposed that comprises a device having a DC power supply and an inductor and circuitry configured to measure the DC voltage and DC current supplied from the DC power supply, which is used to determine the apparent resistance of the susceptor. In these examples, the DC power supply is arranged to supply a DC current to a DC/AC converter, and the measured DC voltage and DC current supplied from the DC power supply are the voltage and the current at the input side of a DC/AC converter. It will be appreciated that embodiments comprising a constant voltage DC power supply may not require the DC voltage to be measured. As described in the above mentioned documents, it has been found that the apparent resistance of the susceptor varies with the temperature of the susceptor in a strictly monotonic relationship over certain ranges of temperature of the susceptor. The strictly monotonic relationship allows for an unambiguous determination of the temperature of the susceptor from a determination of the apparent resistance of the susceptor. In other words, each determined value of the apparent resistance of the susceptor is representative of a single value of the temperature of the susceptor only, such that there is no ambiguity in the relationship. The monotonic relationship of the temperature of the susceptor and the apparent resistance of the susceptor allows for the determination and control of the temperature of the susceptor and thus for the determination and control of the temperature of the volatile substrate.

The aerosol-generating system of the present invention typically comprises a disposable cartridge and a durable or reusable device. Due to variations in the geometry and properties of the susceptors in different cartridges, it may not be possible for a device to accurately determine the absolute temperature of the susceptor based on measurements of the apparent resistance of the susceptor alone, without calibrating the device for each cartridge. Advantageously, the inventors of the present invention have realised that measuring the ambient temperature in the vicinity of the system, in addition to measuring the apparent resistance of the susceptor, provides the control circuitry with additional information that may enable the control system to more accurately estimate the absolute temperature of the susceptor.

In some particularly preferred embodiments, the device comprises a DC power supply and the control circuitry is configured to measure an apparent resistance of the susceptor. The control circuitry may be configured to measure the DC voltage and DC current across the DC power supply to determine the apparent resistance of the susceptor.

In these particularly preferred embodiments, the target value is a target apparent resistance of the susceptor. The control circuitry may be configured to monitor the apparent resistance of the susceptor and to adjust the power supplied to the inductor coil to maintain the apparent resistance of the susceptor at the target apparent resistance value. The target apparent resistance value may correspond to the apparent resistance of the susceptor when the system is being used at a normal ambient temperature and the cartridge is heated to a desired operating temperature.

The target apparent resistance of the susceptor may be any suitable value for the system. The target apparent resistance of the susceptor may vary according to the susceptor configuration, the material of the susceptor, the design of the cartridge, the DC/AC converter, the control circuitry components and the DC power supply. In some embodiments, the target apparent resistance of the susceptor at room temperature may be between about 0.5 and about 10 Ohms, between about 1 and about 7 Ohms, between about 1.5 and about 5 Ohms or between about 2.0 and about 3.5 Ohms.

The control circuitry may be configured to measure the apparent resistance of the susceptor throughout an aerosol-generating experience.

In operation, when the system is used within a normal ambient temperature range, the control circuitry may be configured to monitor the apparent resistance of the susceptor while supplying power to the inductor coil and to control the power supplied to the inductor coil to maintain the apparent resistance of the susceptor at a desired target apparent resistance value. Since the apparent resistance of the susceptor generally corresponds to the temperature of the susceptor, the target apparent resistance value may be set at an expected desirable temperature for the susceptor.

In some embodiments, the control circuitry may store a target apparent resistance profile rather than a single target apparent resistance value. The target apparent resistance profile may comprise target apparent resistance values associated with particular times or time periods within an aerosol-generating experience. Accordingly, when the system is used within a normal ambient temperature range, the control circuitry may be configured to monitor the apparent resistance of the susceptor while supplying power to the inductor coil and to control the power supplied to the inductor coil to maintain the apparent resistance of the susceptor at the desired target apparent resistance value for the particular time during the aerosol-generating experience. In other words, the control circuitry may be configured to control the power supplied to the inductor coil to maintain the apparent resistance of the susceptor at the target apparent resistance profile. The target apparent resistance profile may include an initial preheating target apparent resistance profile. The preheating target apparent resistance profile may gradually increase a target apparent resistance value with time over a preheating time period. The increase may be continuous or the increase may be stepwise or incremental. The rate of increase may be constant over the preheating time period, such that the increase is linear with time. The rate of increase may increase over the preheating time period, such that the increase forms a convex curve with time. The rate of increase may decrease over the preheating time period, such that the increase forms a concave curve with time.

The target apparent resistance value may increase from an initial target apparent resistance value to an operating target apparent resistance value. The target apparent resistance value may be the operating target apparent resistance value after the preheating time period. The target apparent resistance value may increase from an initial target apparent resistance value to a final preheating target apparent resistance value. The final preheating target apparent resistance value may be greater than the operating target apparent resistance value, which is the target apparent resistance value after the preheating time period.

When the readings from the ambient temperature sensor indicate that the ambient temperature in the vicinity of the system is outside of a normal ambient temperature range, the control circuitry may be configured to adjust the target apparent resistance value or the target apparent resistance profile. The control circuitry may be configured to adjust the target apparent resistance by a predetermined amount for a particular range of ambient temperatures.

The magnitude of the predetermined adjustment of the target ambient temperature may be any suitable magnitude. In some preferred embodiments, the predetermined adjustment may be up to about 10 Ohms, up to about 7 Ohms, up to about 5 Ohms, up to about 4 Ohms, up to about 3 Ohms, up to about 2 Ohms or up to about 1 Ohms. In particular embodiments, the magnitude of the adjustment may be up to about 1 Ohms for temperatures in the range of between about 15 degrees Celsius and about 36 degrees Celsius.

The control circuitry of the aerosol-generating device may be configured to control the power supplied to the inductor coil in any suitable manner. Although the control circuitry may be configured to adjust the instantaneous power supplied to the inductor coil, typically, the control circuitry controls the average power supplied to the inductor coil. Preferably, the control circuitry is configured to control the average power supplied to the inductor coil by controlling the duty cycle of the power supply. In particular, the control circuitry may use pulse width modulation to control the average power supplied to the inductor coil.

In the particularly preferred embodiments comprising a DC power supply, the control circuitry may store a normal target apparent resistance which corresponds to the apparent resistance of the susceptor when the susceptor is at the desired operating temperature. The control circuitry may store a plurality of normal target apparent resistances, each normal target apparent resistance being associated with a time period in an aerosol-generating experience.

The plurality of normal target apparent resistances form a normal target apparent resistance profile over time.

The aerosol-generating device advantageously comprises a power supply. Preferably the power supply is a DC power supply. The power supply may be housed within the housing of the device. Typically, the power supply is a battery, such as a lithium iron phosphate battery. However, in some embodiments the power supply may be another form of charge storage device, such as a capacitor. The power supply may require recharging and may have a capacity that allows for the storage of enough energy for one or more user operations, for example one or more aerosol-generating experiences. For example, the power supply may have sufficient capacity to allow for continuous heating of the cartridge for a period of around six minutes, corresponding to the typical time taken to smoke a conventional cigarette, or for a period that is a multiple of six minutes. In another example, the power supply may have sufficient capacity to allow for a predetermined number of puffs or discrete activations of the inductor coil.

The aerosol-generating device comprises control circuitry. The control circuitry is electric circuitry configured to control the supply of power from the power supply to the inductor coil. The control circuitry is connected to the power supply and to the inductor coil. The electric circuitry may be housed within a housing of the device. The electric circuitry may comprise a microprocessor, which may be a programmable microprocessor, a microcontroller, or an application specific integrated chip (ASIC) or other electronic circuitry capable of providing control. The electric circuitry may comprise further electronic components. As mentioned above, the electric circuitry may comprise the ambient temperature sensor. The electric circuitry is configured to regulate a supply of current to the inductor coil. Current may be supplied to the inductor coil continuously following activation of the device or may be supplied intermittently, such as on a puff by puff basis. The electric circuitry advantageously comprises a DC/AC inverter, for supplying an AC current to the inductor coil. The DC/AC inverter may advantageously comprise a Class-D or Class-E power amplifier.

The control circuitry, power supply and inductor coil may be capable of generating a fluctuating electromagnetic field having a magnetic field strength (H-field strength) of between about 1 kilo amperes per meter (kA/m) and about 5 kA/m, between about 2 kA/m and about 3 kA/m or about 2.5 kA m. The inductive heating device may be capable of generating a fluctuating electromagnetic field having a frequency of between about 1 MHz and about 30 MHz, between about 1 MHz and about 10 MHz or between about 5 MHz and about 7 MHz.

For susceptors forming low ohmic loads and having an electrical resistance significantly higher than the electrical resistance of the inductor of the LC load network, the aerosol-generating device of the present invention may heat the susceptor to a temperature in the range of 300-400 degrees Celsius in a time period of around five seconds, or even less than five seconds in some embodiments.

The aerosol-generating device comprises a housing. The housing comprises a chamber for receiving at least a portion of the cartridge. The housing may have a distal end and a proximal end and the chamber may be arranged at the proximal end of the device. The ambient temperature sensor may be arranged at the distal end of the device. The device housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The aerosol-generating system comprises a cartridge. The cartridge may be any suitable type of cartridge containing a volatile substrate and having a susceptor.

The susceptor may be arranged in the cartridge in thermal proximity to the volatile substrate. The term 'thermal proximity' is used herein with reference to the susceptor and volatile substrate to mean that the susceptor is positioned relative to the substrate such that an adequate amount of heat is transferred from the susceptor to the substrate. For example, the term 'thermal proximity' is meant to include embodiments in which the susceptor is in intimate physical contact with the volatile substrate. The term 'thermal proximity' is also meant to include embodiments in which the susceptor is spaced from the volatile substrate and configured to transfer an adequate amount of heat to the volatile substrate via convection or radiation.

The susceptor may comprise one or more susceptor elements. As used herein, a "susceptor element" means a conductive element that heats up when subjected to a changing magnetic field. This may be the result of eddy currents induced in the susceptor element and/or hysteresis losses.

The material and the geometry of the susceptor element can be chosen to provide a desired electrical resistance and heat generation.

Possible materials for the susceptor elements include graphite, molybdenum, silicon carbide, stainless steels, niobium, aluminium and virtually any other conductive elements. The susceptor element may be a ferrous element. The susceptor element may be a ferrite element. The susceptor element may be a stainless steel element. The susceptor element may be a ferritic stainless steel element. Suitable susceptor materials include 410, 420 and 430 stainless steel.

The material of the susceptor element may be chosen because of its Curie temperature. Above its Curie temperature a material is no longer ferromagnetic and so heating due to hysteresis losses no longer occurs. In the case the susceptor element is made from one single material, the Curie temperature may correspond to a maximum temperature the susceptor element should have (that is to say the Curie temperature is identical with the maximum temperature to which the susceptor element should be heated or deviates from this maximum temperature by about 1-3%). This reduces the possibility of rapid overheating.

If the susceptor element is made from more than one material, the materials of the susceptor element can be optimized with respect to further aspects. For example, the materials can be selected such that a first material of the susceptor element may have a Curie temperature which is above the maximum temperature to which the susceptor element should be heated. This first material of the susceptor element may then be optimized, for example, with respect to maximum heat generation and transfer to the volatile substrate to provide for an efficient heating of the susceptor on one hand. However, the susceptor element may then additionally comprise a second material having a Curie temperature which corresponds to the maximum temperature to which the susceptor should be heated, and once the susceptor element reaches this Curie temperature the magnetic properties of the susceptor element as a whole change. This change can be detected and communicated to a microcontroller which then interrupts the generation of AC power until the temperature has cooled down below the Curie temperature again, whereupon AC power generation can be resumed.

At least a portion of the susceptor element may be fluid permeable. As used herein a "fluid permeable" element means an element that allowing liquid or gas to permeate through it. The susceptor element may have a plurality of openings formed in it to allow fluid to permeate through it. In particular, the susceptor element allows the source material, in either gaseous phase or both gaseous and liquid phase, to permeate through it.

The susceptor element may take any suitable form. The susceptor element may comprise, for example, a mesh, flat spiral coil, fibres or a fabric. In some embodiments, the susceptor element may comprises a sheet or a strip.

The cartridge contains a volatile substrate. As used herein, the term "volatile substrate" is used to mean a substrate that is capable of interacting with the device to generate an aerosol. The volatile substrate may be any suitable type of substrate. Typically, the volatile substrate comprises nicotine.

The volatile substrate may be an aerosol-forming substrate. As used herein, an aerosol-forming substrate is a substrate capable of releasing volatile compounds that can form an aerosol. Volatile compounds may be released by heating the aerosol-forming substrate.

The aerosol-forming substrate may be contained in a single compartment of the cartridge.

The aerosol-forming substrate may be a solid aerosol-forming substrate. The solid aerosol-forming substrate may comprise a tobacco-containing material containing volatile tobacco flavour compounds which are released from the substrate upon heating. The aerosol-forming substrate may further comprise an aerosol former that facilitates the formation of a dense and stable aerosol. Examples of suitable aerosol formers are glycerine and propylene glycol.

The solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. As used herein, homogenised tobacco refers to material formed by agglomerating particulate tobacco. Homogenised tobacco may be in the form of a sheet. Homogenised tobacco material may have an aerosol-former content of greater than 5% on a dry weight basis. The aerosol-forming substrate may comprises a gathered crimped sheet of homogenised tobacco material. As used herein, the term 'crimped sheet' denotes a sheet having a plurality of substantially parallel ridges or corrugations. The solid aerosol-forming substrate may be in loose form, or may be provided in a suitable container or compartment of the cartridge.

The aerosol-forming substrate may be a liquid aerosol-forming substrate. The liquid aerosol-forming substrate may comprise nicotine. The nicotine containing liquid aerosol-forming substrate may be a nicotine salt matrix. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised plant-based material. The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. The liquid aerosol-forming substrate may comprise water, solvents, ethanol, plant extracts and natural or artificial flavours.

The liquid aerosol-forming substrate may comprise nicotine and at least one aerosol former. The aerosol former may be glycerine or propylene glycol. The aerosol former may comprise both glycerine and propylene glycol. The liquid aerosol-forming substrate may have a nicotine concentration of between about 0.5% and about 10%, for example about 2%.

The aerosol-forming substrate may comprise a gel. At room temperature, the gel may have a stable size and shape and may not flow. The gel may comprise a thermoreversible gel. This means that the gel will become fluid when heated to a melting temperature and will set into a gel again at a gelation temperature. The gelation temperature is preferably at or above room temperature and atmospheric pressure. The melting temperature is preferably higher than the gelation temperature. Preferably the melting temperature of the gel is above 50 degrees Celsius, or 60 degrees Celsius or 70 degrees Celsius and more preferably above 80 degrees Celsius. The melting temperature in this context means the temperature at which the gel is no longer solid and begins to flow. Preferably, the gel comprises agar or agarose or sodium alginate. The gel may comprise Gellan gum. The gel may comprise a mixture of materials. The gel may comprise water.

In embodiments comprising an aerosol-forming substrate, the aerosol-forming substrate may have a vaporisation temperature of between about 70 degrees Celsius to about 230 degrees Celsius. The aerosol-generating system may be configured to heat the aerosol-forming substrate to an average temperature of between about 60° C. and about 240° C.

In some particularly preferred embodiments, the volatile substrate comprises two or more substrates held separately in the cartridge. The volatile substrate may comprise a nicotine source and an acid source. In these particularly preferred embodiments, the cartridge comprises a first compartment having a first air inlet and a first air outlet, the first compartment containing a nicotine source comprising a first carrier material impregnated with nicotine; and a second compartment having a second air inlet and a second air outlet, the second compartment containing an acid source comprising a second carrier material impregnated with an acid.

In these particularly preferred embodiments, the term "nicotine", is used to describe nicotine, nicotine base or a nicotine salt. In embodiments in which the first carrier material is impregnated with nicotine base or a nicotine salt, the amounts of nicotine recited herein are the amount of nicotine base or amount of ionised nicotine, respectively.

The first carrier material may be impregnated with liquid nicotine or a solution of nicotine in an aqueous or non-aqueous solvent.

The first carrier material may be impregnated with natural nicotine or synthetic nicotine.

The acid source may comprise an organic acid or an inorganic acid.

Preferably, the acid source comprises an organic acid, more preferably a carboxylic acid, most preferably an alpha-keto or 2-oxo acid or lactic acid.

Advantageously, the acid source comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid and combinations thereof. Advantageously, the acid source comprises pyruvic acid or lactic acid. More advantageously, the acid source comprises lactic acid.

The first carrier material and the second carrier material may be the same or different.

The first carrier material and the second carrier material may have any suitable structure. The first carrier material and the second carrier material are porous materials. The first carrier material and the second carrier material may have a fibrous or spongy or foam-like structure. The first and second carrier materials may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, terylene or polypropylene fibres, nylon fibres or ceramic. The first carrier material and the second carrier material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

Advantageously, the first compartment of the cartridge may contain a nicotine source comprising a first carrier material impregnated with between about 1 milligram and about 40 milligram of nicotine.

Preferably, the first compartment of the cartridge contains a nicotine source comprising a first carrier material impregnated with between about 3 milligram and about 30 milligram of nicotine. More preferably, the first compartment of the cartridge contains a nicotine source comprising a first carrier material impregnated with between about 6 milligram and about 20 milligram of nicotine. Most preferably, the first compartment of the cartridge contains a nicotine source comprising a first carrier material impregnated with between about 8 milligram and about 18 milligram of nicotine.

The first compartment of the cartridge may further comprise a flavourant. Suitable flavourants include, but are not limited to, menthol. The first carrier material may be impregnated with the nicotine and a flavourant. Advantageously, the first carrier material may be impregnated with between about 3 milligrams and about 12 milligrams of flavourant.

Advantageously, the second compartment of the cartridge may contain a lactic acid source comprising a second carrier material impregnated with between about 2 milligrams and about 60 milligrams of lactic acid.

Preferably, the second compartment of the cartridge contains a lactic acid source comprising a second carrier material impregnated with between about 5 milligrams and about 50 milligrams of lactic acid. More preferably, the second compartment of the cartridge contains a lactic acid source comprising a second carrier material impregnated with between about 8 milligrams and about 40 milligrams of lactic acid. Most preferably, the second compartment of the cartridge contains a lactic acid source comprising a second carrier material impregnated with between about 10 milligrams and about 30 milligrams of lactic acid.

The aerosol-generating system may be required to heat one or more of the nicotine source and the acid source to any suitable desired temperature. The desired temperature may be a temperature that results in the heated source having desired properties, such as a particular desired viscosity or surface temperature. Preferably, the desired temperature is below the boiling point of the source.

The aerosol-generating system may be configured to heat at least one of the first compartment and the second compartment of the cartridge to a desired temperature. The system may be configured to heat at least one of the first compartment and the second compartment to a desired temperature by any suitable configuration of the susceptor, inductor coil, power supply and electronics. For example, the dimensions and number of turns of the inductor coil, the dimensions and material of the susceptor and the power supplied to the inductor coil may be selected according to the desired temperature that the system.

The aerosol-generating system may be configured to heat both the first compartment and the second compartment to a desired temperature. The system may be configured to heat the first compartment to a first desired temperature and to heat the second compartment to a second desired temperature. In some preferred embodiments, the first desired temperature may be substantially the same as the second desired temperature. In some embodiments, the first desired temperature may be different from the second desired temperature.

Preferably, the aerosol-generating system is configured to heat at least one of the first compartment and the second compartment of the cartridge to a temperature of below about 250 degrees Celsius. Preferably, the heater is configured to heat the first compartment and the second compartment of the cartridge to a temperature of between about 80 degrees Celsius and about 150 degrees Celsius.

As used herein with reference to the invention, by "substantially the same temperature" it is meant that the difference in temperature between the first compartment and the second compartment of the cartridge measured at corresponding locations relative to the centre of the compartment is less than about 3° C.

In use, heating the first compartment and the second compartment of the cartridge to a temperature above ambient temperature advantageously enables the vapour concentrations of the nicotine in the first compartment of the cartridge and the vapour pressure of acid in the second compartment of the cartridge to be controlled and balanced proportionally to yield an efficient reaction stoichiometry between the nicotine and the acid. Advantageously, this may improve the efficiency of the formation of nicotine salt particles and the consistency of delivery to a user. Advantageously, it may also reduce the delivery of unreacted nicotine and unreacted acid to a user.

It has been found that a target temperature of around 100 degrees Celsius to around 110 degrees Celsius is a desirable target temperature to heat one or more of the nicotine and acid sources to yield an efficient reaction stoichiometry.

The present invention has been found to be particularly advantageous in these preferred systems, comprising a nicotine source and an acid source for the in situ generation of an aerosol comprising nicotine salt particles. It has been found that the ambient temperature compensation provided by the present invention produces a more consistent aerosol over a wide range of ambient temperatures in these systems. It is believed that ambient temperature compensation is particularly important in these systems, since these systems require the average temperature of each compartment to be maintained at a desired temperature in order to yield an efficient reaction stoichiometry.

In some particularly preferred embodiments, the first compartment and the second compartment are arranged in series within the cartridge.

In some particularly preferred embodiments, the first compartment and the second compartment are arranged in parallel within the cartridge. The first compartment and the second compartment may be arranged symmetrically with respect to each other within the cartridge.

As used herein, by "parallel" it is meant that the first compartment and the second compartment are arranged within the cartridge so that in use a first air stream drawn through the cartridge passes into the first compartment through the first air inlet, downstream through the first compartment and out of the first compartment through the first air outlet and a second air stream drawn through the cartridge passes into the second compartment through the second air inlet, downstream through the second compartment and out of the second compartment through the second air outlet. Nicotine vapour is released from the nicotine source in the first compartment into the first air stream drawn through the cartridge and acid vapour is released from the acid source in the second compartment into the second air stream drawn through the cartridge. The nicotine vapour in the first air stream reacts with the acid vapour in the second air stream in the gas phase to form an aerosol of nicotine salt particles.

The cartridge may comprise a housing formed from any suitable material or combination of materials. Suitable materials include, but are not limited to, aluminium, polyether ether ketone (PEEK), polyimides, such as Kapton®, polyethylene terephthalate (PET), polyethylene (PE), high-density polyethylene (HDPE), polypropylene (PP), polystyrene (PS), fluorinated ethylene propylene (FEP), polytetrafluoroethylene (PTFE), polyoxymethylene (POM), epoxy resins, polyurethane resins, vinyl resins, liquid crystal polymers (LCP) and modified LCPs, such as LCPs with graphite or glass fibres.

In embodiments comprising a solid aerosol-forming substrate, the cartridge may comprise a wrapper formed from any suitable wrapping material, such as cigarette paper.

The aerosol-generating system may further comprise a mouthpiece. In the particularly preferred embodiments comprising a nicotine source and an acid source, nicotine vapour released from the nicotine source and acid vapour released from the acid source may react with one another in the gas phase in the mouthpiece to form an aerosol of nicotine salt particles.

In embodiments in which the mouthpiece is configured for engagement with the cartridge or forms part of the cartridge, the combination of the cartridge and the mouthpiece may simulate the shape and dimensions of a combustible smoking article, such as a cigarette, a cigar, or a cigarillo. Advantageously, in such embodiments the combination of the cartridge and the mouthpiece may simulate the shape and dimensions of a cigarette.

The mouthpiece may be configured for engagement with the housing of the aerosol-generating device.

The mouthpiece may be designed to be disposed of once the nicotine in the first compartment and the acid in the second compartment are depleted.

The mouthpiece may comprise any suitable material or combination of materials. Examples of suitable materials include thermoplastics that are suitable for food or pharmaceutical applications, for example polypropylene, polyetheretherketone (PEEK) and polyethylene. The mouthpiece may comprise the same material as the cartridge. The mouthpiece and the cartridge may comprise different materials.

According to a second aspect of the present invention, there is provided an aerosol-generating device configured to receive a cartridge containing a volatile substrate and having a susceptor. The aerosol generating device comprises: a housing having a chamber sized to receive at least a portion of a cartridge; an inductor coil disposed around at least a portion of the chamber; a power supply; an ambient temperature sensor; and control circuitry configured to control the supply of power from the power supply to the inductor coil based on one or more ambient temperature readings from the ambient temperature sensor.

According to a third aspect of the present invention there is provided a method of controlling inductive heating in an aerosol-generating system comprising a cartridge containing a volatile substrate and having a susceptor and an aerosol-generating device configured to receive the cartridge, the aerosol-generating device having an inductor coil disposed around at least a portion of a chamber for receiving the cartridge, a power supply, an ambient temperature sensor and control circuitry connected to the inductor coil, the control circuitry being configured to control the supply of power from the power supply to the inductor coil. The method comprises: sensing the ambient temperature using the ambient temperature sensor; and controlling the supply of power from the power supply to the inductor coil based on one or more ambient temperature readings from the ambient temperature sensor.

In some preferred embodiments, the controlling of the power supplied to the inductor coil from the power supply based on one or more ambient temperature readings from the ambient temperature sensor comprises: adjusting a target value based on the one or more ambient temperature readings from the ambient temperature sensor; and controlling the supply of power to the inductor coil based on the adjusted target value.

The magnitude of the increase or decrease in the target apparent resistance of the susceptor may vary as a function of the one or more ambient temperature readings from the ambient temperature sensor.

The magnitude of the increase or decrease in the target resistance may be determined based on a comparison of the one or more ambient temperature readings from the ambient temperature sensor with a plurality of reference ambient temperature values, each reference ambient temperature value being associated with a particular target value adjustment.

The power supply of the aerosol-generating device may be a DC power supply; and the method may further comprise the step of monitoring the apparent resistance of the susceptor. The target value may be a target apparent resistance of the susceptor; and the supply of power to the inductor coil may be controlled to maintain the apparent resistance of the susceptor at the adjusted target apparent resistance.

For the avoidance of doubt, feature described above in relation to one aspect of the invention may also be applicable to other aspects of the invention. In particular, any feature described in relation to the first aspect may be equally applicable to the second and third aspects, any feature described in relation to the second aspect may be equally applicable to the first and third aspects and any feature described in relation to the third aspect may be equally applicable to the first and second aspects.

Embodiments of the invention will now be described, by way of example only, with reference to the accompanying drawings, in which:

FIGS. 1 to 5 show schematic illustrations of a cartridge according to an embodiment of the invention for use in an aerosol-generating system for generating an aerosol comprising nicotine lactate salt particles.

Figure 1:
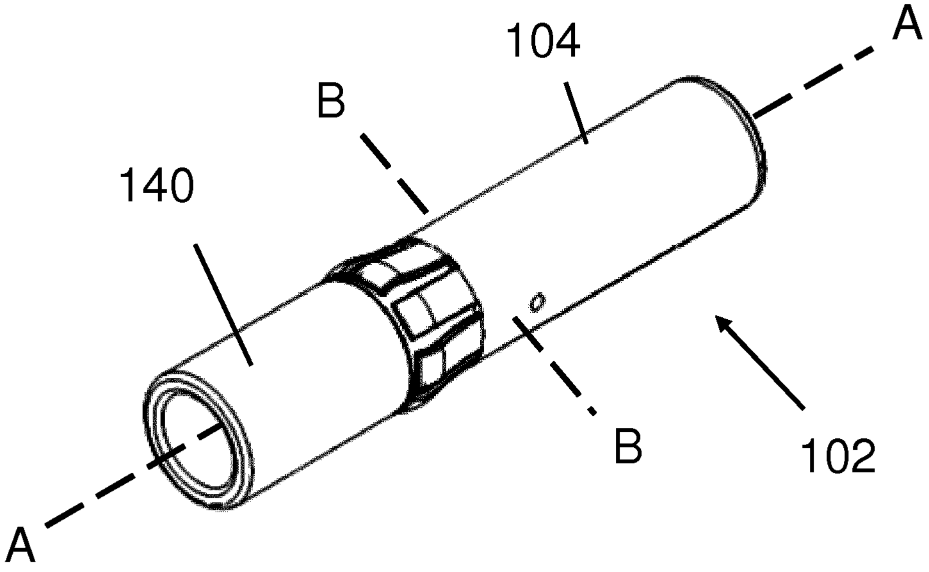
FIG. 1 shows a perspective view of a cartridge according to an embodiment of the present invention.
Figure 2:
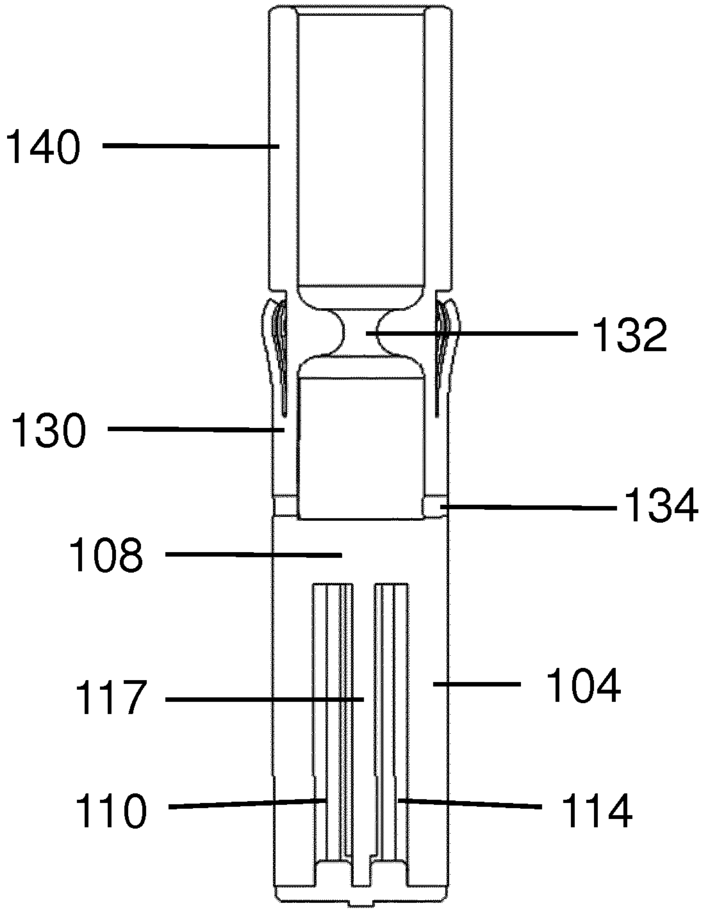
FIG. 2 shows a cross-sectional view of the cartridge of FIG. 1 along the line A-A.

The cartridge 102 comprises an elongate body 104 and a distal end cap 106. The cartridge 102 has a length of about 28 millimetres and a diameter of about 6.9 millimetres.

The cartridge 102 comprises a cartridge portion 105 at a distal end of the cartridge, which extends between the distal end of the body 104 and a proximal end wall 108. The cartridge portion 105 has a length of about 15 millimetres and a diameter of about 6.9 millimetres.

The cartridge portion 105 of the cartridge 102 comprises an elongate first compartment 110 that extends from the distal end of the body 104 to the proximal end wall 108. The first compartment 110 contains a nicotine source and susceptor arrangement 112 in accordance with the present invention. The nicotine source comprises a first carrier material impregnated with about 10 milligrams of nicotine and about 4 milligrams of menthol. The susceptor comprises a ferromagnetic stainless steel mesh covering one side of the first carrier material.

The cartridge portion 105 of the cartridge 102 also comprises an elongate second compartment 114 that extends from the distal end of the body 104 to the proximal end wall 108. The second compartment 114 contains a lactic acid source and susceptor arrangement 116 in accordance with the present invention. The lactic acid source comprises a second carrier material impregnated with about 20 milligrams of lactic acid. The susceptor comprises a ferromagnetic stainless steel mesh covering one side of the second carrier material.

The first compartment 110 and the second compartment 114 are arranged in parallel. The first compartment 110 and the second compartment 114 are arranged adjacent to each other, separated by a partition wall 118.

The first compartment 110 and the second compartment 114 are substantially the same shape and size. The first compartment 110 and the second compartment 114 have a length of about 12 millimetres, a width of about 5 millimetres and a height of about 1.7 millimetres.

The first carrier material and the second carrier material comprise a non-woven sheet of PET/PBT and are substantially the same shape and size. The shape and size of the first carrier material and the second carrier material is similar to the shape and size of the first compartment 110 and the second compartment 114 of the cartridge 102, respectively.

Figure 3:
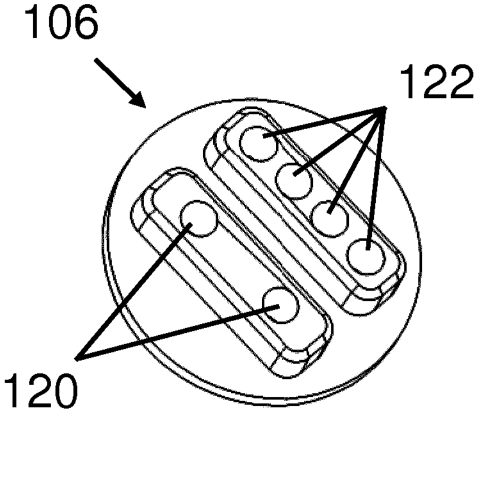
FIG. 3 shows a perspective view of the distal end cap of the cartridge of FIG. 1.

As shown in FIG. 3, the distal end cap 106 comprises a first elongate raised portion 119 and a second elongate raised portion 121. The first and second elongate raised portions 119, 121 are arranged in parallel and extend out of the plane of the cap 106 in substantially the same direction. The first elongate raised portion 119 is sized and arranged to be received in the open distal end of the first compartment 110 and the second elongate raised portion 121 is sized and arranged to be received in the open distal end of the second compartment 114. The distal end cap 106 further comprises a first air inlet 120 comprising a row of two spaced apart apertures and a second air inlet 122 comprising a row of four spaced apart apertures. The row of apertures of the first air inlet 120 and the row of apertures of the second air inlet 122 are arranged in parallel.

The row of apertures of the first air inlet 120 are arranged along the first raised portion 119 and extend through the first raised portion 119. The row of apertures of the second air inlet 122 are arranged along the second raised portion 121 and extend through the second raised portion 121. Each of the apertures forming the first air inlet 120 and the second air inlet 122 is of substantially circular transverse cross-section and has a diameter of about 0.5 millimetres.

Figure 4:
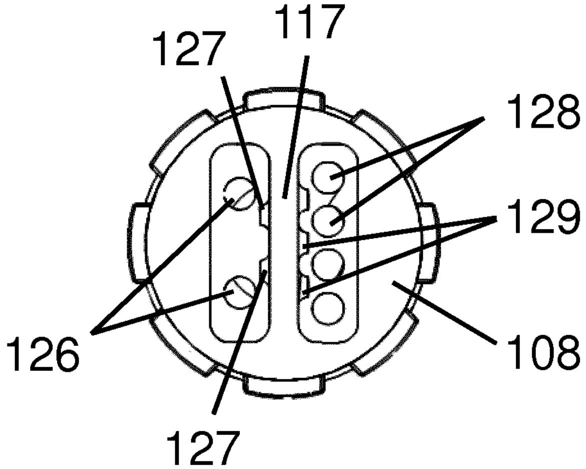
FIG. 4 shows cross-sectional plan view of the cartridge portion of the cartridge of FIG. 1, along the line B-B.

As shown in FIG. 4, the proximal end wall 108 of the cartridge portion 105 comprises a first air outlet 126 comprising a row of two spaced apart apertures and a second air outlet 128 comprising a row of four spaced apart apertures. The first air outlet 126 is aligned with the first compartment 110 and the second air outlet 128 is aligned with the second compartment 114. Each of the apertures forming the first air outlet 126 and the second air outlet 128 is of substantially circular transverse cross-section and has a diameter of about 0.5 millimetres.

Also as shown in FIG. 4, the first compartment 110 comprises two protrusions or ribs 127 protruding from the partition wall 118 towards the opposite side of the chamber 110. The protrusions 127 of the first chamber 110 extend substantially the length of the first compartment 110 and are spaced apart such that an air channel forms between the protrusions. The second compartment 114 comprises three protrusions or ribs 129 protruding from the partition wall 118 towards the opposite side of the chamber 114. The protrusions 129 of the second chamber 114 are substantially similar to the protrusions of the first chamber 110, having the same width and extending substantially the length of the second chamber 114. The protrusions 129 of the second chamber 124 are spaced apart such that two air channels are formed between them, one air channel between each of the adjacent protrusions. The protrusions 127 of the first chamber 110 and the protrusions 129 of the second chamber 114 are provided to space the first and second carrier material and susceptor arrangements 112, 116 from the partition wall 118, to ensure sufficient airflow over the outer surface of the carrier material and susceptor arrangements at least on one side.

Figure 5:
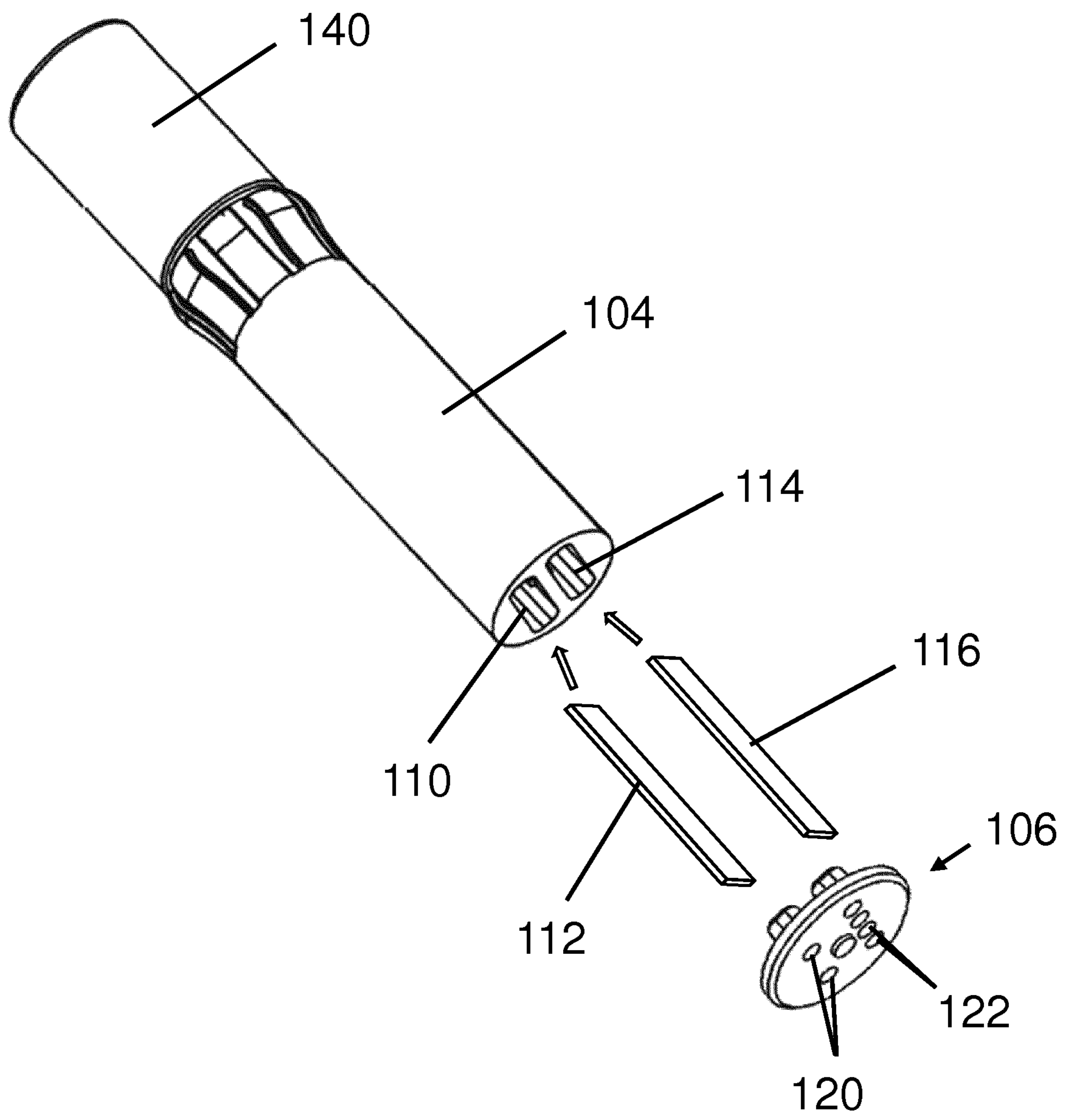
FIG. 5 shows a partially exploded perspective view of the cartridge of FIG. 1, including the nicotine source and susceptor arrangement and the lactic acid source and susceptor arrangement.

As shown in FIG. 5, to form the cartridge 102, the first carrier material is impregnated with nicotine and menthol and the first carrier material and susceptor arrangement 112 is inserted into the first compartment 110 and the second carrier material is impregnated with lactic acid and the second carrier material and susceptor arrangement 116 is inserted into the second compartment 114. The distal end cap 106 is then inserted onto the distal end of the body 104 such that the first air inlet 120 is aligned with the first compartment 110 and the second air inlet 122 is aligned with the second compartment 114.

The first air inlet 120 is in fluid communication with the first air outlet 126 so that a first air stream may pass into the cartridge 102 through the first air inlet 120, through the first compartment 110 and out of the cartridge 102 though the first air outlet 126. The second air inlet 122 is in fluid communication with the second air outlet 128 so that a second air stream may pass into the cartridge 102 through the second air inlet 122, through the second compartment 114 and out of the cartridge 102 though the second air outlet 128.

Prior to first use of the cartridge 102, the first air inlet 120 and the second air inlet 122 may be sealed by a removable peel-off foil seal or a pierceable foil seal (not shown) applied to the external face of the distal end cap 106. Similarly, prior to first use of the cartridge 102, the first air outlet 126 and the second air outlet 128 may be sealed by a removable peel-off foil seal or a pierceable foil seal (not shown) applied to the external face of the proximal end wall of the body 104.

The cartridge 102 further comprises a third compartment 130 downstream of the first compartment 110 and the second compartment 114 and in fluid communication with the first air outlet 120 of the first compartment 110 and the second air outlet 122 of the second compartment 114. During use, the nicotine vapour in the first air stream react with the acid vapour in the second air stream in the third compartment 130 to form an aerosol of nicotine salt particles.

The third compartment 130 comprises a single opening 132 at the proximal end of the compartment, with a diameter of about 1.3 millimetres. The third compartment 130 also comprises a ventilation inlet 132 to allow external air to enter the third compartment and dilute the nicotine, acid and nicotine lactate salt vapours. The ventilation inlet has a diameter of about 0.5 millimetres.

The cartridge 102 also comprises a mouthpiece portion 140 downstream of the third compartment 130 and in fluid communication with the opening 132 at the proximal end of the third compartment 130. The mouthpiece portion 140 has a length of about 13 millimetres and an opening at the proximal end of the cartridge 102 with a diameter of about 5 millimetres.

In use, a user draws on the mouthpiece portion 140 of the cartridge 102 to draw air through the first and second compartments 110, 112 into the third compartment 130, through the third compartment 130 into the mouthpiece portion 140 and out of the mouthpiece portion 140 through the opening at the proximal end.

Figure 6:
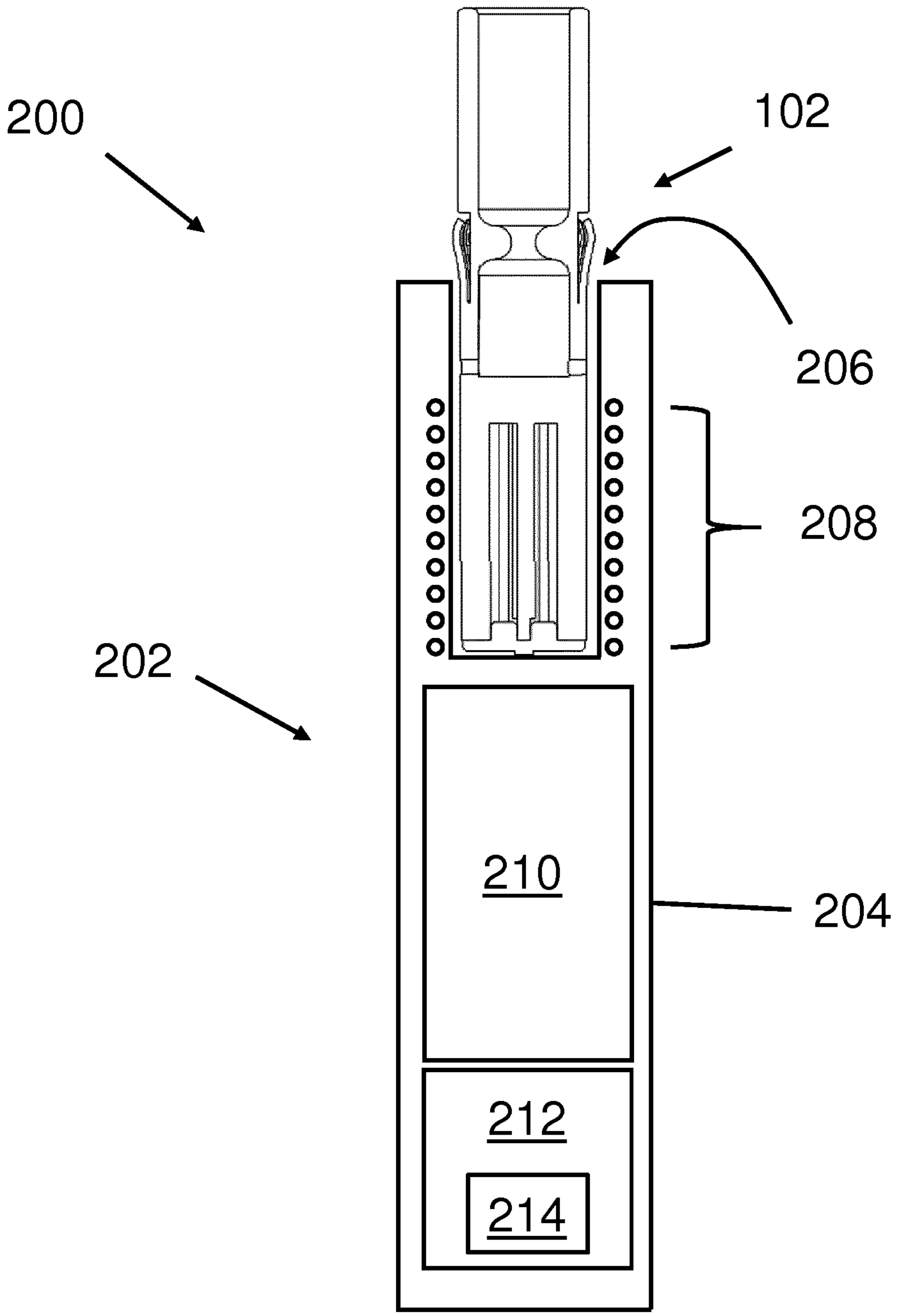
FIG. 6 shows an embodiment of an aerosol-generating system according to the present invention having the cartridge of FIG. 1 and an aerosol-generating device.

FIG. 6 shows a schematic illustration of an aerosol-generating system 200 according to an embodiment of the invention for generating an aerosol comprising nicotine lactate salt particles.

The aerosol-generating system comprises an aerosol-generating device 202 and a cartridge 102 according the embodiment of the invention shown in FIGS. 1 to 5.

The aerosol-generating device 202 comprises a housing 204 defining a cavity 206 at a proximal end of the housing 204 for receiving the distal portion of the cartridge 102 between the distal end cap 106 and the proximal end wall 108.

An inductor coil 208 is provided along the length of the cavity 206, and is coaxially aligned with the cavity 206 such that the coil 208 substantially circumscribes the cavity. When the cartridge 102 is received in the cavity 206, the inductor coil 208 extends along the length of the first and second compartments 110, 114.

The aerosol-generating device 202 further comprises a power supply 210 and control circuitry 212 housed within the housing 204. The power supply 210 is connected to the inductor coil 208 via the control circuitry 212 and the control circuitry is configured to control the supply of power supplied to the inductor coil 208 from the power supply 210.

The power supply 210 is configured to provide a high frequency oscillating current to the inductor coil 208, with a frequency of between about 5 and about 7 MHz. In operation, the high frequency oscillating current is passed through the inductor coil 208 to generate an alternating magnetic field that induces a voltage in the susceptor elements. The induced voltage causes a current to flow in the susceptor elements and this current causes Joule heating of the susceptor elements that in turn heats the nicotine in the first chamber 110 and the acid in the second chambers 114. During use, the control circuitry 212 of the aerosol-generating device 202 controls the supply of power from the power supply 210 aerosol-generating device 202 to the inductor coil 208 to heat the susceptor in the first compartment 110 and the susceptor in the second compartment 114 of the cartridge 102 to substantially the same temperature of about 100° C.

The control circuitry 212 comprises a microcontroller having a temperature sensor 214, in accordance with the present invention.

In this embodiment, the control circuitry 212 is arranged at a distal end of the device 202, opposite a proximal end of the device 202 comprising the cavity 206 for receiving the cartridge 102. Since the control circuitry 212 is arranged at the opposite end of the device 202 to the cavity 206, the control circuitry 212 is substantially thermally isolated from the cavity 206. In other words, the control circuitry 212 is spaced from the cavity 206 such that raising the temperature of the cartridge does not raise the temperature of the control circuitry 212. Since the control circuitry 212 is thermally isolated from the cavity 206, the temperature sensor 214 of the control circuitry 212 may be used as an ambient temperature sensor. Advantageously, this arrangement of the control circuitry and the ambient temperature sensor in the device may simplify construction of the device and may the reduce cost, as an additional temperature sensor, separate from the control circuitry 212, is not required.

When the cartridge 102 has been inserted into the cavity 206 of the aerosol-generating device 202, the mouthpiece 140 extends out of the cavity 206 such that a user may access the mouthpiece 140 to draw on the proximal end and receive an aerosol of nicotine lactate salt particles.

The device 202 comprises a switch (not shown). In use, a user presses the switch to turn on the device 202. When the device is turned on, the control circuitry 212 supplies an oscillating current from the power supply 210 to the inductor coil 208 to heat the susceptor elements in the first and second compartments of the cartridge 102. The system 200 requires the temperature of the first and second compartments to be increased to an operating temperature of around 100 degrees Celsius before a user may take a first puff on the device. This is to ensure consistent aerosol of nicotine lactate salt particles is generated. In this embodiment, the preheating time is around 5 seconds, if the system 200 is heated from an ambient room temperature of 20 degrees Celsius. After the preheating time, when the first and second compartments are at an operating temperature of around 100 degrees Celsius, a user may take a first puff on the mouthpiece 140 of the cartridge 102. When taking a puff, the user draws on the proximal end of the mouthpiece 140 to draw a first air stream through the first compartment 110 of the cartridge 102 and a second air stream through the second compartment 114 of the cartridge 102. As the first air stream is drawn through the first compartment 110 of the cartridge 102, nicotine vapour is released from the first carrier material into the first air stream. As the second air stream is drawn through the second compartment 114 of the cartridge 102, lactic acid vapour is released from the second carrier material into the second air stream. The nicotine vapour in the first air stream and the lactic acid vapour in the second air stream are drawn from the first and second compartments into the third compartment 130. Ambient air is also drawn into the third compartment 130 via the ventilation inlet 134. In the third compartment 130 the nicotine vapour from the first air stream and the lactic acid vapour in the second air stream react with one another in the gas phase to form an aerosol of nicotine salt particles. The aerosol of nicotine salt particles is drawn out of the third compartment 130 through the proximal opening 132 into the mouthpiece 140 and is delivered to the user through the proximal end of the mouthpiece 140.

Figure 7:
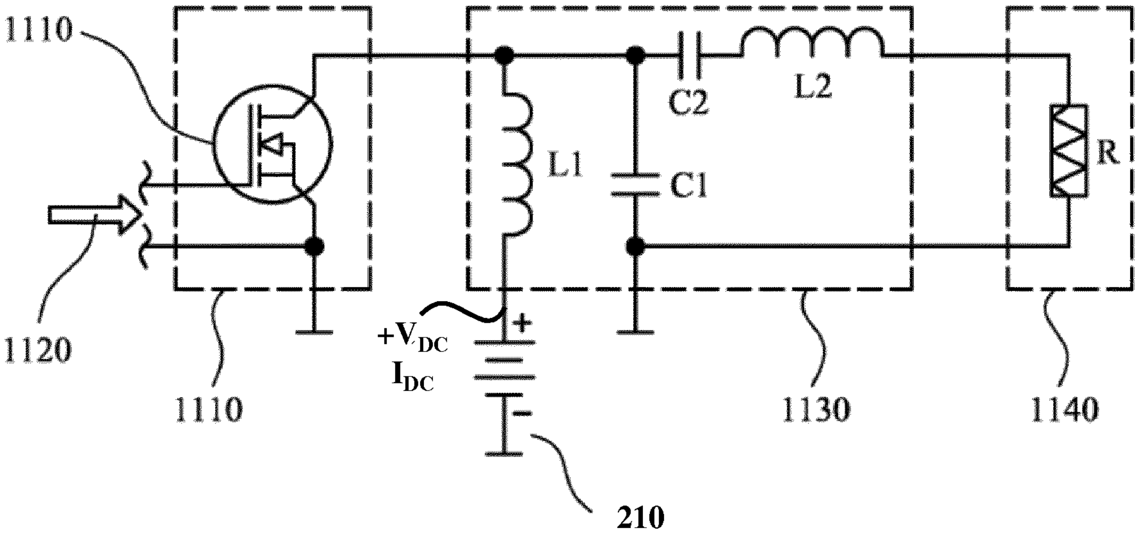
FIG. 7 shows an embodiment of control circuitry for the device of FIG. 6.

FIG. 7 illustrates an example of part of a control circuit 212 that may be used to provide a high frequency oscillating current to the inductor coil, using a Class-E power amplifier. As can be seen from FIG. 7, the circuit includes a Class-E power amplifier including a transistor switch 1100 comprising a Field Effect Transistor (FET) 1110, for example a Metal-Oxide-Semiconductor Field Effect Transistor (MOSFET), a transistor switch supply circuit indicated by the arrow 1120 for supplying the switching signal (gate-source voltage) to the FET 1110, and an LC load network 1130 comprising a shunt capacitor C1 and a series connection of a capacitor C2 and inductor coil L2. The DC power source, which comprises the battery 210, includes a choke L1, and supplies a DC supply voltage. Also shown in FIG. 7 is the ohmic resistance R representing the total ohmic load 1140, which is the sum of the ohmic resistance $R_{Coil}$ of the flat spiral inductor coil, marked as L2, and the ohmic resistance $R_{Load}$ of the susceptor element.

The DC supply voltage $V_{DC}$ and the DC current $I_{DC}$ drawn from the DC power source (the battery 210) are shown in FIG. 7. The DC supply voltage $V_{DC}$ and the DC current $I_{DC}$ drawn from the DC power source are provided by feed-back channels (not shown) to the microcontroller of the control circuitry 212. Measurements of both the DC supply voltage $V_{DC}$ and the DC current $I_{DC}$ drawn from the DC power source are used to determine the apparent resistance $R_A$ of the susceptor. More specifically, the quotient of the DC supply voltage $V_{DC}$ and the DC supply current $I_{DC}$ are used to determine the apparent resistance $R_A$ of the susceptor. The apparent resistance $R_A$ of susceptor is used to control the further supply of AC power to the LC load network, and in particular to inductor L2, as described in more detail below.

In this embodiment, both the DC supply voltage $V_{DC}$ and the DC current $I_{DC}$ drawn from the DC power source are measured, which may be achieved with a suitable DC voltage sensor and a suitable DC current sensor integrated in the circuit. However, in some embodiments the DC power source may be a constant voltage DC power source, and as such, the DC supply voltage $V_{DC}$ may be known. In these embodiments, only the DC current $I_{DC}$ drawn from the DC power source needs to be measured, and so the DC voltage sensor may be dispensed with.

Due to the very low number of components the volume of the power supply electronics can be kept extremely small. This extremely small volume of the power supply electronics is possible due to the inductor L2 of the LC load network 1130 being directly used as the inductor for the inductive coupling to the susceptor element, and this small volume allows the overall dimensions of the entire inductive heating device to be kept small.

The general operating principle of the Class-E power amplifier is known and is described in detail in "Class-E RF Power Amplifiers", Nathan O. Sokal, published in the bimonthly magazine QEX, edition January/February 2001, pages 9-20, of the American Radio Relay League (ARRL), Newington, CT, U.S.A., and in WO 2015/177043 A1, in the name of Philip Morris Products S.A.

Although a Class-E power amplifier is preferred for most systems in accordance with the disclosure, it is also possible to use other circuit architectures, such as circuit architectures including a Class-D power amplifier, as also described in WO 2015/177043 A1, in the name of Philip Morris Products S.A.

As mentioned above, the control circuitry 212 is configured to measure the apparent resistance $R_A$ of the susceptor In accordance with the present invention, the microcontroller of the control circuitry 212 is programmed to measure the apparent resistance $R_A$ of the susceptor and control the power supplied from the DC power supply 210 to the inductor coil 208 to maintain the apparent resistance $R_A$ of the susceptor at a target apparent resistance value over time. The control circuitry 212 is configured to control the supply of power from the DC power supply 210 to the inductor coil 208 by controlling the switch duty cycle of the class-E power amplifier.

A "normal" or "standard" target apparent resistance value, $R_0$, corresponds to the desired target apparent resistance of the susceptor when the system is being used in a normal ambient temperature range. In this embodiment, a normal ambient temperature range is between 13 degrees Celsius and 27 degrees Celsius (i.e. 7 degrees Celsius above and below a normal room temperature of 20 degrees Celsius).

The control circuitry 212 is programmed to measure the ambient temperature in the vicinity of the system by taking ambient temperature readings from the ambient temperature sensor 214. The control circuitry 212 is programmed to measure the ambient temperature before supplying power to from the power supply 210 to the inductor coil 208.

When the ambient temperature readings from ambient temperature sensor 214 indicate that the ambient temperature is within the normal ambient temperature range, the control circuitry 212 is programmed to supply power from the power supply 210 to the inductor coil 208, measure the apparent resistance of the susceptor 210, compare the measured apparent resistance to the normal target apparent resistance $R_0$ and control the supply of power from the power supply 210 to the inductor coil 208 to maintain the measured apparent resistance at the normal target apparent resistance $R_0$.

In this example, when the ambient temperature readings from ambient temperature sensor 214 indicate that the ambient temperature is outside of the normal ambient temperature range, the control circuitry 212 is configured to adjust the normal target apparent resistance value, $R_0$, by a predetermine amount. In this way, the control circuitry 212 is programmed to compensate for the ambient temperature in which the system is being used. It has been found that this temperature control may improve the consistency of the aerosol generated by such an aerosol-generating system.

Figure 8:
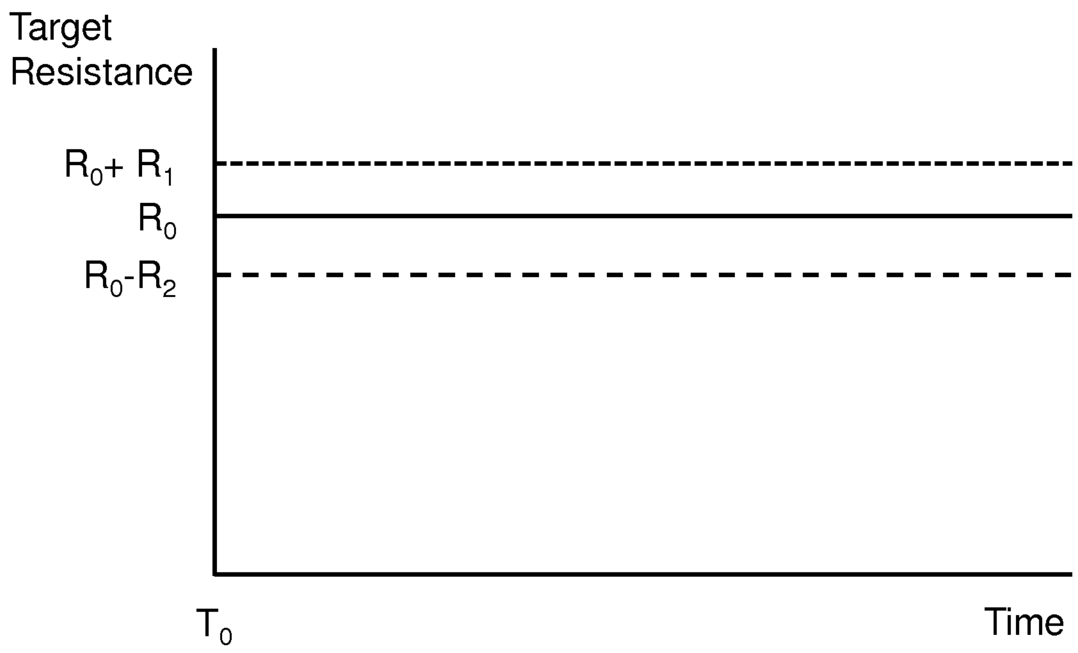
FIG. 8 shows a first example of a target apparent resistance profile over time set by the control circuitry of the device of FIG. 6.
Figure 9:
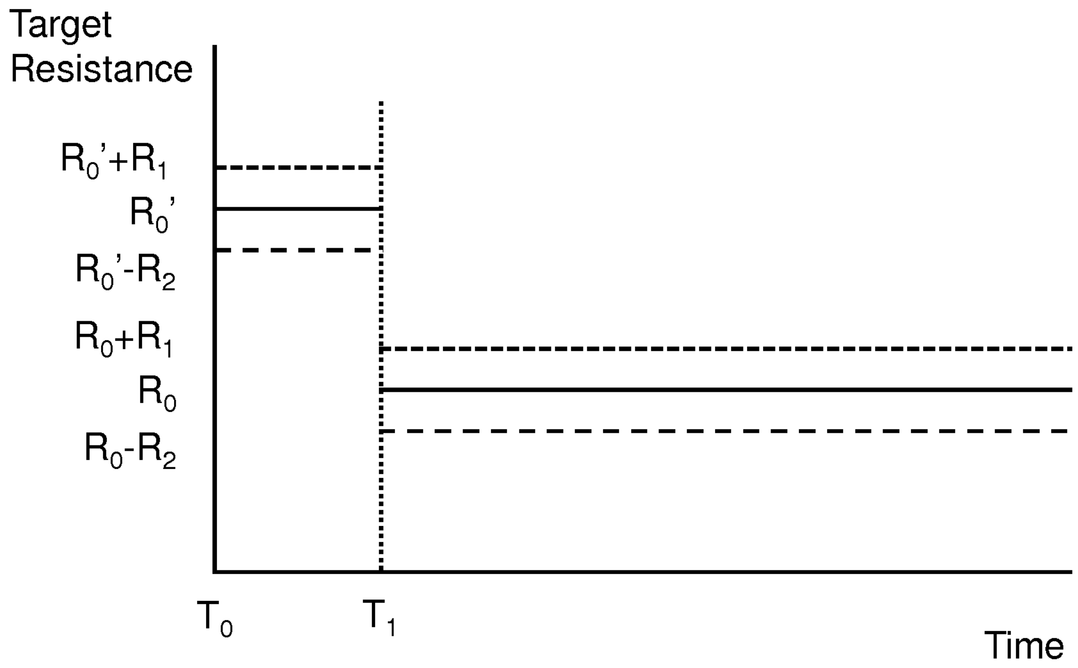
FIG. 9 shows a second example of a target apparent resistance profile over time set by the control circuitry of the device of FIG. 6.

FIGS. 8 and 9 illustrate two exemplary target apparent resistance profiles for the system and two target apparent resistance profile adjustments in accordance with the present invention.

FIG. 8 illustrates a first exemplary target apparent resistance profile during an aerosol-generating experience. In this example, target apparent resistance value is constant during the aerosol-generating experience. In other words, the target apparent resistance value for the system does not vary with time during the aerosol-generating experience.

In this example, a normal target apparent resistance value, $R_0$, is stored on a memory of the control circuitry. The normal target apparent resistance value $R_0$ is set during a calibration procedure before first use of the device, such as in the factory before the device is shipped. Calibration may comprise providing a cartridge in the device as shown in FIG. 6 above, arranging the cartridge and device in an environment having a known ambient temperature, supplying power from the DC power supply to the inductor coil to heat susceptor in the cartridge, measuring the temperature of the susceptor using a separate temperature sensor and measuring the apparent resistance of the susceptor when the temperature of the susceptor reaches a desired temperature. The normal target resistance value, $R_0$, is taken to be the measured apparent resistance and is stored on a memory of the control circuitry.

When the ambient temperature readings indicate that the ambient temperature is within the normal ambient temperature range (i.e. in this example, between 13 degrees Celsius and 27 degrees Celsius) the control circuitry is programmed to adjust the duty cycle of the power supply such that the apparent resistance of the susceptor is maintained at the normal target apparent resistance value $R_0$.

Predetermined adjustment values for the target apparent resistance value are also stored on the memory of the control circuitry. The predetermined adjustment values are also set during a calibration procedure, similar to the calibration procedure for the normal target apparent resistance value. Each adjustment value may be based on a measured apparent resistance of the susceptor when the susceptor is at a known temperature.

When the ambient temperature readings indicate that the ambient temperature is below the normal ambient temperature range (i.e. in this example, below 13 degrees Celsius) the control circuitry is programmed to add a first predetermined adjustment value, $R_1$, to the normal target apparent resistance value. The control circuitry is further programmed to adjust the duty cycle of the power supply such that the apparent resistance of the susceptor is maintained at the adjusted target apparent resistance value, $R_0+R_1$.

When the ambient temperature readings indicate that the ambient temperature is above the normal ambient temperature range (i.e. in this example, above 27 degrees Celsius) the control circuitry is programmed to subtract a second predetermined adjustment value, $R_2$, from the normal target apparent resistance value. The control circuitry is further programmed to adjust the duty cycle of the power supply such that the apparent resistance of the susceptor is maintained at the adjusted target apparent resistance, $R_0-R_2$.

FIG. 9 illustrates a second exemplary target apparent resistance profile during an aerosol-generating experience. In this example, the target apparent resistance value is a first value $R_0'$ during a preheating time period $T_0$ and is a second value $R_0$ after the preheating time period $T_0$.

In this example, a normal preheating target apparent resistance value, $R_0'$, is stored on a memory of the control circuitry, associated with a predetermined preheating time period $T_0$, and a normal target apparent resistance value, $R_0$, is also stored on a memory of the control circuitry.

When the ambient temperature readings indicate that the ambient temperature is within the normal ambient temperature range (i.e. in this example, between 13 degrees Celsius and 27 degrees Celsius) the control circuitry is programmed to adjust the duty cycle of the power supply such that the apparent resistance of the susceptor is maintained at the normal preheating target apparent resistance value $R_0'$ during a preheating time period $T_0$, and to adjust the duty cycle of the power supply such that the apparent resistance of the susceptor is maintained at the normal target apparent resistance value $R_0$ after a preheating time period $T_0$.

When the ambient temperature readings indicate that the ambient temperature is below the normal ambient temperature range (i.e. in this example, below 13 degrees Celsius) the control circuitry is programmed to add a first predetermined adjustment value, $R_1$, to the normal preheating target apparent resistance value $R_0'$ and to the normal target apparent resistance value $R_0$. The control circuitry is further programmed to adjust the duty cycle of the power supply such that the apparent resistance of the susceptor is maintained at the adjusted preheating target apparent resistance, $R_0'+R_1$, for the preheating time period $T_0$, and at the adjusted target apparent resistance, $R_0+R_1$, after the preheating time period $T_0$.

When the ambient temperature readings indicate that the ambient temperature is above the normal ambient temperature range (i.e. in this example, above 27 degrees Celsius) the control circuitry is programmed to subtract a second predetermined adjustment value, $R_2$, from the normal preheating target apparent resistance value $R_0'$, and from the normal target apparent resistance value $R_0$. The control circuitry is further programmed to adjust the duty cycle of the power supply such that the apparent resistance of the susceptor is maintained at the adjusted preheating target apparent resistance, $R_0'-R_2$, for the preheating time period $T_0$, and at the adjusted target apparent resistance, $R_0-R_2$, after the preheating time period $T_0$.

In this example, the normal preheating target resistance is constant over the preheating time period; however, it will be appreciated that in other embodiments the normal preheating target resistance may be increased over time from an initial preheating target resistance to a final preheating target resistance. The rate of increase may be constant, such that the increase is linear with time, or may increase or decrease such that the increase forms a convex or concave curve with time. The rate of increase may be determined by the materials and geometry of the susceptor.

In this example, the magnitude of the adjustment of the target apparent resistance value is the same for each target apparent resistance value in the target apparent resistance profile. In other words, the same amount is added to or subtracted from the target preheating apparent resistance and the target apparent resistance.

In both of these examples, the magnitude of the first adjustment value $R_1$ and the second adjustment value $R_2$ are the same. However, it will be appreciated that in other examples each adjustment value may have a different magnitude.

In some embodiments, the control circuitry may be programmed to adjust the normal target apparent resistance, $R_0$, by further predetermined amounts when the ambient temperature readings indicate that the ambient temperature is outside of one or more further ambient temperature ranges. For example, an extreme ambient temperature range may be defined by ambient temperature indications below 15 degrees Celsius and above 35 degrees Celsius. When the ambient temperature is determined to be below the extreme ambient temperature threshold (i.e. below 5 degrees Celsius), the control circuitry may be programmed to increase the normal target apparent resistance $R_0$ by a third predetermined amount, $R_3$, greater than the first predetermined amount, $R_1$, such that the target apparent resistance value is $R_0+R_3$. When the ambient temperature is determined to be above the extreme ambient temperature threshold (i.e. above 35 degrees Celsius), the control circuitry may be programmed to decrease the normal target apparent resistance $R_0$ by a fourth predetermined amount, $R_4$, greater than the second predetermined amount, $R_2$, such that the target apparent resistance value is $R_0-R_4$.

In some embodiments, the control circuitry may be programmed to substantially prevent or inhibit power from being supplied from the power supply to the inductor coil when the ambient temperature readings indicate that the ambient temperature is outside of a particular operating temperature range.

In some embodiments, the target apparent resistance value may be adjusted by amounts that vary over time. In some embodiments, the control circuitry may be configured to take ambient temperature readings during an aerosol-generating experience and to adjust the target apparent resistance value based on the ambient temperature readings throughout the aerosol generating experience. In some embodiments, the target apparent resistance value is adjusted as a function of the ambient temperature readings, based on a known relationship between susceptor temperature and the apparent resistance.

Other cartridge designs incorporating susceptor elements in accordance with this disclosure can now be conceived by one of ordinary skill in the art. For example, the cartridge may not comprise susceptor elements in one or more of the first and second compartments, but rather may comprise may comprise one or more susceptor elements arranged in one or more additional compartments, isolated from the first and second compartments such that the one or more susceptor elements do not contact the nicotine or the acid. In some embodiments, the cartridge may comprise one or more susceptor elements within one or more of the first and second compartments and one or more susceptor elements in one or more additional compartments, isolated from the nicotine and acid. For example, the cartridge may not include a mouthpiece portion, but rather the device may include a mouthpiece portion. The mouthpiece portion may have any desired shape. Furthermore, a coil and susceptor arrangement in accordance with the disclosure may be used in systems of other types to those already described, such as humidifiers, air fresheners, and other aerosol-generating systems comprising cartridges.

It will also be appreciated that other types of cartridges containing other types of volatile substrate may be used with such a device comprising an ambient temperature sensor according to the invention. For example, a cartridge comprising a susceptor and a single compartment containing a liquid aerosol-forming substrate may be used with such a device having an ambient temperature sensor. In these embodiments, the device may be configured to supply sufficient power to the inductor coil to heat the susceptor to vaporise an aliquot of the aerosol-forming substrate. In these embodiments, the device may comprise a puff sensor, and the control circuitry may be configured to supply power to the inductor coil when a puff from a user is detected by the puff sensor. In another example, cartridges in the form of a rod comprising a solid aerosol-forming substrate, such as a plug of homogenised, crimped tobacco, a susceptor and a filter, wrapped together in the form of a rod, for example with cigarette paper, may be used with such a device having an ambient temperature sensor.

The exemplary embodiments described above are illustrative but are not limiting. In view of the above discussed exemplary embodiments, other embodiments consistent with the above exemplary embodiments will now be apparent to one of ordinary skill in the art.

The invention claimed is:

1. An aerosol-generating system, comprising:

a cartridge containing a volatile substrate and having a susceptor; and an aerosol-generating device configured to receive the cartridge, the aerosol-generating device comprising:

a housing having a chamber sized to receive at least a portion of the cartridge, an inductor coil disposed around at least a portion of the chamber, a power supply, an ambient temperature sensor, and control circuitry configured to control a supply of power from the power supply to the inductor coil based on one or more ambient temperature readings from the ambient temperature sensor, the control circuitry being configured to control the supply of power by:

adjusting a target value based on the one or more ambient temperature readings from the ambient temperature sensor, and controlling the supply of power to the inductor coil based on the adjusted target value.

2. The aerosol-generating system according to claim 1, wherein a magnitude of the adjustment of the target value varies as a function of the one or more ambient temperature readings from the ambient temperature sensor.

3. The aerosol-generating system according to claim 1, wherein a magnitude of the adjustment of the target value is determined based on a comparison of the one or more ambient temperature sensor readings with a plurality of reference ambient temperature values, each reference ambient temperature value being associated with a particular target value adjustment.

4. The aerosol-generating system according to claim 1, wherein:

the power supply is a DC power supply and the control circuitry is further configured to monitor an apparent resistance of the susceptor by measuring DC current supplied from the DC power supply, the target value is a target apparent resistance of the susceptor, and the control circuitry is further configured to control the supply of DC power to the inductor coil to maintain the apparent resistance of the susceptor at the adjusted target apparent resistance value.

5. The aerosol-generating system according to claim 1, wherein the control circuitry is further configured to adjust the target value based on the one or more ambient temperature readings to raise a temperature of the cartridge from ambient temperature to a desired operating temperature in a predetermined preheating time.

6. The aerosol-generating system according to claim 1, wherein the ambient temperature sensor is spaced from the chamber configured to receive the cartridge.

7. The aerosol-generating system according to claim 6, wherein the control circuitry and the ambient temperature sensor are provided on a printed circuit board spaced from the chamber configured to receive the cartridge.

8. The aerosol-generating system according to claim 1, wherein the cartridge further comprises:

a first compartment having a first air inlet and a first air outlet, the first compartment containing a nicotine source, and a second compartment having a second air inlet and a second air outlet, the second compartment containing an acid source.

9. The aerosol-generating system according to claim 8, wherein the cartridge further comprises a third compartment, separate from the first and the second compartments, and the second susceptor material is arranged in the third compartment.

10. An aerosol-generating device configured to receive a cartridge containing a volatile substrate and having a susceptor, the aerosol generating device comprising:

a housing having a chamber sized to receive at least a portion of the cartridge;

an inductor coil disposed around at least a portion of the chamber;

a power supply;

an ambient temperature sensor; and control circuitry configured to control a supply of power from the power supply to the inductor coil based on one or more ambient temperature readings from the ambient temperature sensor, the control circuitry being configured to control the supply of power by:

adjusting a target value based on the one or more ambient temperature readings from the ambient temperature sensor, and controlling the supply of power to the inductor coil based on the adjusted target value.

11. A method of controlling inductive heating in an aerosol-generating system comprising a cartridge containing a volatile substrate and having a susceptor and an aerosol-generating device configured to receive the cartridge, the aerosol-generating device having an inductor coil disposed around at least a portion of a chamber configured to receive the cartridge, a power supply, an ambient temperature sensor, and control circuitry configured to control a supply of power from the power supply to the inductor coil, the method. comprising:

sensing ambient temperature using the ambient temperature sensor; and controlling the supply of power from the power supply to the inductor coil based on one or more ambient temperature readings from the ambient temperature sensor by:

adjusting a target value based on the one or more ambient temperature readings from the ambient temperature sensor, and controlling the supply of power to the inductor coil based on the adjusted target value.

12. The method according to claim 11, wherein a magnitude of the adjustment of the target resistance varies as a function of the one or more ambient temperature readings from the ar bient temperature sensor.

13. The method according to claim 11, wherein a magnitude of the adjustment in the target value is determined based on a comparison of the one or more ambient temperature readings from the ambient temperature sensor with a plurality of reference ambient temperature values, each reference ambient temperature value being associated with a particular target value adjustment.

14. The method according to claim 11, wherein:

the power supply of the aerosol-generating device is a DC power supply, the method further comprises the step of monitoring an apparent resistance of the susceptor, the target value is a target apparent resistance of the susceptor, and the supply of power to the inductor coil is controlled to maintain the apparent resistance of the susceptor at the adjusted target apparent resistance.

15. The method according to claim 11, wherein the target value is adjusted based on the one or more ambient temperature readings to raise a temperature of the cartridge from the ambient temperature to a desired operating temperature in a predetermined preheating time.

* * * * *